United States Patent
Kaufman et al.

(10) Patent No.: US 11,449,052 B1
(45) Date of Patent: Sep. 20, 2022

(54) COORDINATING TASKS BETWEEN MOBILE COMPONENTS UTILIZING INTRUSION DETECTION

(71) Applicant: Amazon Technologies, Inc., Seattle, WA (US)

(72) Inventors: Seth R. Kaufman, Arlington, MA (US); Michael James O'Connor, Charlestown, MA (US); Ashish Shah, Lincoln, MA (US); Kevin John Trenholme, Stow, MA (US)

(73) Assignee: Amazon Technologies, Inc., Seattle, WA (US)

( * ) Notice: Subject to any disclaimer, the term of this patent is extended or adjusted under 35 U.S.C. 154(b) by 648 days.

(21) Appl. No.: 16/216,661

(22) Filed: Dec. 11, 2018

(51) Int. Cl.
G05D 1/00 (2006.01)
G05B 19/418 (2006.01)
G05D 1/02 (2020.01)

(52) U.S. Cl.
CPC ..... G05D 1/0055 (2013.01); G05B 19/41895 (2013.01); G05D 1/0234 (2013.01); *G05D 2201/0216* (2013.01)

(58) Field of Classification Search
CPC .............. G05D 1/0055; G05D 1/0234; G05D 2201/0216; G05B 19/41895
See application file for complete search history.

(56) References Cited

U.S. PATENT DOCUMENTS

| | | | | |
|---|---|---|---|---|
| 6,166,371 A | * | 12/2000 | Milbrath | F16P 3/144 250/221 |
| 8,280,547 B2 | * | 10/2012 | D'Andrea | B66F 9/063 700/214 |
| 8,930,133 B2 | * | 1/2015 | Wurman | G06Q 10/087 701/422 |
| 9,087,314 B2 | * | 7/2015 | Hoffman | G05B 19/41895 |
| 10,248,120 B1 | * | 4/2019 | Siegel | G05D 1/0223 |
| 10,347,369 B1 | * | 7/2019 | Dudzinski | G06Q 50/22 |
| 2010/0023183 A1 | | 2/2010 | Hashimoto et al. | |
| 2011/0232972 A1 | * | 9/2011 | McQueen | G01G 19/4144 177/1 |

(Continued)

FOREIGN PATENT DOCUMENTS

| | | | | |
|---|---|---|---|---|
| CN | 101517622 A | * | 8/2009 | ............. G08C 17/02 |
| CN | 108064212 A | * | 5/2018 | ............. B65G 1/0457 |
| JP | 1124750 A | | 1/1999 | |

OTHER PUBLICATIONS

U.S. Appl. No. 16/406,424, "Techniques for Coordinating Movement of Components Within a Workspace" filed May 8, 2019.

(Continued)

*Primary Examiner* — Redhwan K Mawari
(74) *Attorney, Agent, or Firm* — Kilpatrick Townsend & Stockton LLP

(57) ABSTRACT

Systems and methods are provided herein for utilizing controller device within a workspace. The controller device may operate in a first state to monitor a light curtain associated with an interaction area of the workspace and to cause an indication of the first state to be presented at an indicator device associated with the interaction area. While operating in the first state, the controller device may detect a breach of the light curtain. The controller device may perform at least one remedial action based at least in part on detecting the breach of the light curtain while operating in the first state.

18 Claims, 10 Drawing Sheets

(56) References Cited

U.S. PATENT DOCUMENTS

| | | | | |
|---|---|---|---|---|
| 2012/0235579 A1* | 9/2012 | Chemel | .................. | F21S 2/005 |
| | | | | 315/152 |
| 2015/0073589 A1 | 3/2015 | Khodl et al. | | |
| 2016/0121487 A1* | 5/2016 | Mohan | ..................... | H04L 67/34 |
| | | | | 700/248 |
| 2016/0129917 A1* | 5/2016 | Gariepy | ................. | G05D 1/024 |
| | | | | 701/2 |
| 2016/0259061 A1* | 9/2016 | Carter | ..................... | G01S 19/05 |
| 2016/0271800 A1 | 9/2016 | Stubbs et al. | | |
| 2017/0344023 A1* | 11/2017 | Laubinger | ............. | B60W 50/14 |
| 2018/0062328 A1* | 3/2018 | Westbury | ........... | H01R 13/7175 |
| 2018/0143321 A1* | 5/2018 | Skowronek | ............. | G01S 17/42 |
| 2019/0176323 A1 | 6/2019 | Coady et al. | | |
| 2019/0381223 A1* | 12/2019 | Culbert | .................. | A61B 17/22 |
| 2020/0301432 A1* | 9/2020 | Bose | .................... | G06Q 10/087 |
| 2021/0065107 A1* | 3/2021 | Jajula | ................. | G06Q 10/0836 |

OTHER PUBLICATIONS

Durocher, et al., An Overview of Remote Isolation Systems Applied in Process Industries, Aug. 2017. IEEE Transactions on Industry Applications, vol. 53, No. 4, (Year: 2017) 6 pages.
U.S. Department of Labor Occupational Safety and Health Administration, OSHA Fact Sheet, 2002. (Year: 2002) 2 pages.

* cited by examiner

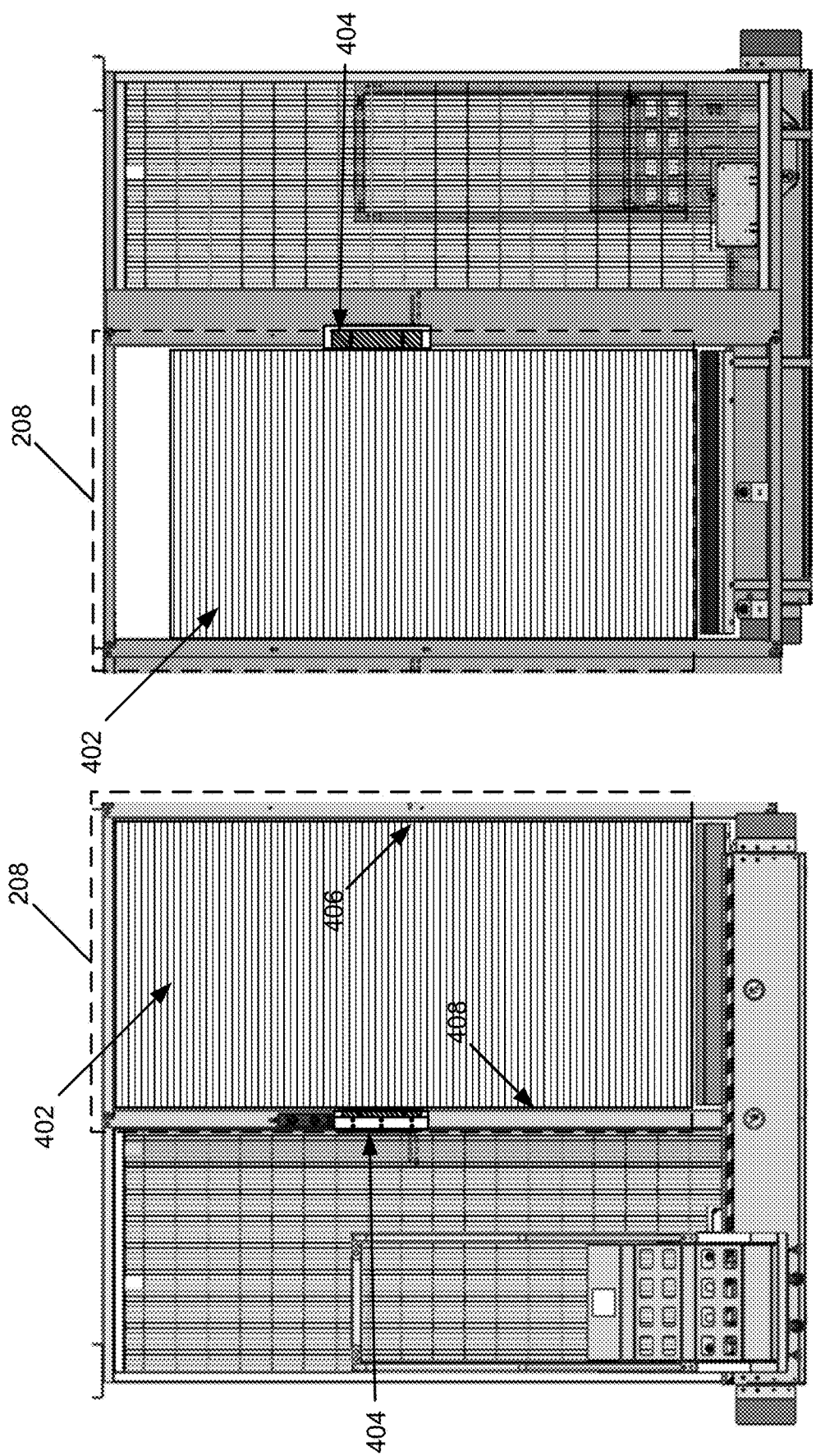

COORDINATING TASKS BETWEEN MOBILE COMPONENTS UTILIZING INTRUSION DETECTION

BACKGROUND

Modern inventory systems, such as those in mail order warehouses, supply chain distribution centers, airport luggage systems, and custom-order manufacturing facilities, often utilize mobile robotic devices to convey items and/or storage containers within a workspace. Coordinating tasks between the various components of these systems (e.g., the mobile robotic devices, personnel, etc.) can be cumbersome. As inventory systems grow, the challenges of simultaneously completing a large number of packing, storing, and other inventory-related tasks utilizing these types of components becomes non-trivial. In systems tasked with responding to large numbers of diverse task requests, inefficient utilization of system resources, including space, equipment, and manpower, can result in lower throughput, unacceptably long response times, an ever-increasing backlog of unfinished tasks, and, in general, poor system performance. Coordination between various components of these systems is desirable to improve efficiency and throughput.

BRIEF DESCRIPTION OF THE DRAWINGS

Various embodiments in accordance with the present disclosure will be described with reference to the drawings, in which:

FIGS. 4A and 4B are schematic diagrams illustrating multiple views of an exemplary interaction area including a light curtain and an indicator device, in accordance with at least one embodiment;

DETAILED DESCRIPTION

Figure 1:
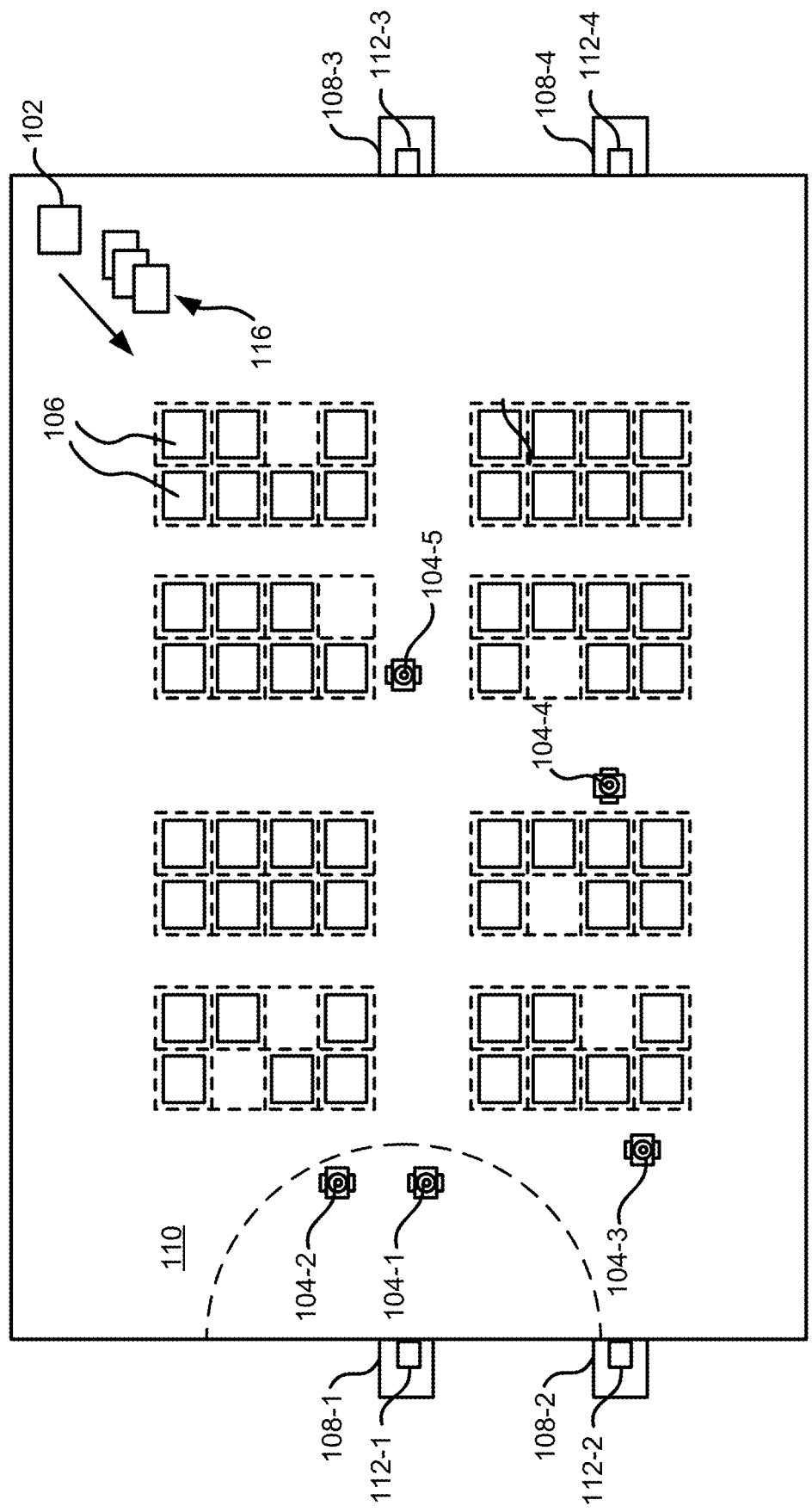
FIG. 1 is a schematic diagram illustrating an example environment suitable for implementing aspects of an inventory system, in accordance with at least one embodiment.

Techniques described herein are directed to systems and method for coordinating tasks between mobile components operating within a system (e.g., an inventory system). In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order so as not to obscure the embodiment being described. Although examples may be provided which include an inventory system and/or workspace, it should be appreciated that the same techniques may be applied in a variety of contexts such as mail order warehouses, supply chain distribution centers, airport luggage systems, and custom-order manufacturing facilities, to name a few.

In at least one embodiment, a number of mobile drive units may operate within a workspace of an inventory system. Each mobile drive unit may be a robotic device in any suitable form that may be configured to convey a variety of storage containers and/or items within the workspace. The workspace may further include one or more workstations. A "workstation," as used herein, may include an area within which one or more tasks (e.g., stowing items, retrieving items, etc.) may be performed (e.g., by an operator via accessing a storage container). A station computing device of the workstation may receive task assignments for tasks to be performed in the workstation. The workstation may further include an interaction area of any suitable size and/or dimensions through which an operator may reach through to access a storage container placed near the interaction area (e.g., by a mobile drive unit). A number of light emitters and receivers may be situated within the interaction area. These light emitters/receivers may be utilized to generate a light curtain that spans at least some portion of the interaction area. A number of motion sensors (e.g., time of flight sensors) may be situated near the interaction area to detect motion (e.g., motion of the storage container and/or the mobile drive unit) and/or an object placed, at or passing within, a threshold distance of the interaction area. As the workstation is utilized, a controller device may be communication with the motion sensors, the station computing device, and the light emitters/receivers that generate the light curtain in order to coordinate tasks between components (e.g., the mobile drive units, an operator of the workstation, etc.) of the system.

In some embodiments, an operator of the workstation may connect with a management system of the workspace utilizing the station computing device. The management system may be configured to assign tasks, determine instructions and/or routes to perform those tasks, and communicate with the mobile drive units, and/or the station computing devices, and/or user devices operated by human personnel within the workspace to effectuate the completion of those tasks. In some embodiments, an operator of a workstation may provide user credentials (e.g., username and/or password, identification information, etc.) via an input device of the station computing device (e.g., a keyboard, an RFID reader, a barcode reader, etc.). The user may be authenticated and logged onto the station computing device. The user may then select a type of task or a particular task via the station computing device. In response, the management system may assign the operator/station one or more tasks within the system (e.g., stowing items within a storage container at the workstation, retrieving particular items from particular storage containers, and the like). Additionally, the management system may assign one or more mobile drive units tasks assignments that correspond to conveying one or more storage containers to the station in accordance with the tasks assigned to the operator/station.

A controller device in communication with the various components of the workstation may be configured to monitor the light curtain within the interaction area of the workstation. This monitoring may occur even during times when the workstation is not actively being utilized by an operator. In some embodiments, such monitoring may commence in response to an indication that the workstation and/or interaction area is in use. By way of example, the controller device may transition to an "armed" state during which it may be configured to monitor the light curtain for breaches. The transition to this armed state may, in some embodiments, occur in response to receiving an indication that the operator of the workstation has logged on to the station computing device and/or has received a task assignment from the management system.

In some embodiments, the workstation may further include an indicator device. In some embodiments, this indicator device may provide visual and/or audio indications of particular states of operation associated with the interaction area. As a non-limiting example, the indicator device may include a light pipe. In some embodiments, the light pipe may include depressions etched or otherwise situated on a solid substrate (e.g., plastic, glass, etc.) from which light may be emitted. In some embodiments, the light pipe may be molded such that indents may be included and light may be emitted from those indents. The indicator device may have one or more sides (e.g., 3 sides). In some embodiments, the indicator device may include a single area or multiple distinct areas. In some embodiments, the indicator device may include 3 areas, each area having corresponding indents/etchings from which light (e.g., colored light, white light, etc.) may be emitted. The indicator device may be situated at any suitable location within the workspace. In some embodiments, the indicator device may be positioned at an edge of the interaction area of the workspace. The exact height at which the indicator device is placed may be predetermined. In some embodiments, this height may correspond to a height at which the indicator device is visible within a range of 15 degrees of eye level (above or below) with respect to an average height associated with a human operator standing at, or within a threshold distance of, the interaction area.

In response to transitioning to the armed state, or while operating in the armed state, the controller device may communicate (e.g., via a wireless and/or a wired connection) with the indicator device to cause the indicator device to display an indication of the armed state. As a non-limiting example, the controller device may transmit any suitable data to cause the indicator device to display yellow light at one or more areas. As a specific example, the indicator device may present yellow light utilizing a top area and a bottom area, while a middle area of the indicator device remains unlit.

While operating in the armed state, the controller device may monitor the light curtain for breaches. Should an object (e.g., some portion of the operator, an item, etc.) traverse through the light curtain, the breach may be detected. As a non-limiting example, one or more receivers corresponding to one or more light emitters of the light curtain may provide data indicating that the light from a corresponding light emitter was not received. In response to receiving this indication, the controller device may transition to a "breach" state. While operating in this breach state, the controller device with the indicator device to cause the indicator device to display an indication of the breach state. As a non-limiting example, the controller device may transmit any suitable data to cause the indicator device to display red light at one or more areas. As a specific example, the indicator device may present red light utilizing a top area, a middle area, and a bottom area of the indicator device.

In some embodiments, the controller device may further be configured with a wireless communications transmitter device configured for short-range wireless communications. By way of example, the wireless communications transmitter device may be configured to transmit a short range radio signal. In some embodiments, each mobile drive unit operating within the workspace may include a receiver configured to receive these short-range signals. In at least one embodiment, receipt of the signal and/or any suitable data transmitted by the wireless communications transmitter device may cause a receiving mobile drive unit to halt motion. Due to the short range nature of the signal, this may cause mobile drive units within a threshold distance of the controller device (e.g., located at the workstation) to halt motion, while any remaining mobile drive units operating outside the threshold distance may proceed with their assigned tasks. Accordingly, localized safety measures are enabled utilizing the techniques disclosed herein.

In scenarios in which a breach state is reached, the controller device may be configured to continually and/or periodically transmitting the short range signal for the duration of operation in the breach state. Subsequently, the operator and/or an authorized user (e.g., a manager associated with higher authority credentials) may provide an electronic override via user input provided at the station computing device. Alternatively, the controller device itself may include an input mechanism (e.g., a scanner, keyboard, mechanical key) with which an override/reset intent may be entered. Upon receiving an indication of override/reset, the controller device may be configured to cease transmission of the short range signal and transition back to an armed state. While operating in the armed state, the controller device may transmit data to the indicator device to update the provided indication to indicate guard state operation (e.g., transmit back to displaying the yellow areas as discussed above).

Presuming that a breach has not occurred, and in accordance with a task assignment, a mobile drive unit may approach the interaction area as it conveys a storage container to the workstation. In some embodiments, the mobile drive unit may utilize physical markers (e.g., fiducial markers, bar codes, RFID tags, etc.) placed on the floor of the workspace for navigation. For example, these physical markers may embed and/or otherwise identify physical locations within the workspace with which the mobile drive unit may read to identify its location within the workspace. In some embodiments, the mobile drive unit may be configured to align its traversal path across one or more of these physical markers such that an input device (e.g., a camera, a reader device, etc.) may pass over the physical marker. In some embodiments, at least one physical marker adjacent to the workspace (e.g., directly adjacent to the interaction area of the workspace) may be positioned to ensure that the mobile drive unit and/or the storage container conveyed by the mobile drive unit passes and/or is placed at or exceeding a distance (e.g., 150 millimeters, plus or minus 30 millimeters) from the interaction area. As a non-limiting example, a physical marker adjacent to the interaction area may be physically placed such that a storage container maintains a 120-180 millimeter gap from the interaction area.

One or more sensors (e.g., time of flight sensors) may be positioned near the interaction area and configured to detect motion and/or an object near the interaction area. For example, as the mobile drive unit conveys the storage container within the threshold distance of the interaction area, the one or more sensors may detect motion. Sensor data of the one or more sensors may be received by the controller device. The one or more sensors may provide sensor data at any suitable interval to the controller device. When the sensor data received indicates that mobile drive unit/storage container has ceased motion (or just before the mobile drive unit has ceased motion), the controller device may transition to a "ready" state. As part of this transition, or at any suitable time while operating in this "ready" state, the controller device may transit data to cause the indicator device to display an indication of this "ready" state. As a non-limiting example, the controller device may transmit any suitable data to cause the indicator device to display green light at one or more areas of the indicator device. As a specific example, the indicator device may present green light utilizing a middle area of the indicator device, while a top area and bottom area of the indicator device remain unlit.

While operating in the "ready" state, the controller device may receive indication from the light receivers of the light curtain indicating one or more breaches. However, as a result of operating in the "ready" state, the controller device may be configured to ignore these indications. Accordingly, the controller device may not transition to a breach state despite a breach indication as a result of currently operating in the "ready" state. In some embodiments, a mobile drive unit may be restricted from moving (e.g., by the management system) until an operator no longer has need to access a particular storage container. For example, the operator may enter an indication (e.g., via the station computing device) that he has completed a task with the currently stationed storage container and/or that he is ready to commence a next task. The station computing device may transmit a release request to the controller device to request that the mobile drive unit be allowed to move the storage container away from the interaction area. If an object is determined to be breaching the light curtain, the controller device may be configured to wait a period of time (e.g., 3 seconds, 5 seconds, etc.) to determine whether the breach is resolved. If an object is still breaching the light curtain after the time period has elapsed, the controller device may deny the request to release. However, if the light curtain is not being breached and/or the breach is resolved during a threshold period of time, the controller device may be configured to transition to the "armed" state and further cause the indicator device to display an indication of the armed state. Once transitioned, the controller device may grant the release request, which may cause the station computing device to request the management system to instruct the mobile drive unit away from the workstation. Upon receiving instructions, the mobile drive unit may travel away from the workstation.

It should be appreciated that the techniques discussed above are applicable in contexts other that inventory situations. Utilizing the techniques discussed herein, safety measures of the inventory system are improved. For example, utilizing physical marker placement, a threshold distance between a storage container and an interaction area may be maintained so as to avoid injury to a storage container, personnel, or any suitable component of the system. Additionally, or alternatively, by utilizing the controller device, the system may ensure that breaches of the light curtain are detected when there is a danger of injury (e.g., while components are in motion). Should a breach occur during an armed state, the short range nature of the signal provided by the controller device may ensure efficient use of the workspace and increase throughput during such instances. Rather than shutting down an entire floor due to a breach being detected, safety measures (e.g., the halting of one or more mobile drive units) may be localized to affect only components located within a threshold distance of the breach. As yet another enhancement, once a storage container is placed at the interaction area, the controller device may further improve safety at the workstation by ensuring that the storage container may not be moved while it is being accessed by an operator. Any suitable combination of the above improvements can lead to a safer and more efficient use of a workspace, which in turn, may increase throughput of the system as a whole.

FIG. 1 is a schematic diagram illustrating an example environment suitable for implementing aspects of an inventory system 100, in accordance with at least one embodiment. As a non-limiting example, the inventory system 100 may include a management module 102, one or more mobile drive units (e.g., mobile drive unit 104-1, mobile drive unit 104-2, mobile drive unit 104-3, mobile drive unit 104-4, and mobile drive unit 104-5, collectively referred to as "mobile drive units 104"), one or more storage containers (e.g., storage containers 106), and one or more workstations (e.g., workstation 108-1, workstation 108-2, workstation 108-3, workstation 108-4, collectively referred to as "workstations 108"). In some embodiments, workstations 108 may include one or more controller devices (e.g., controller device 112-1, controller device 112-2, controller device 112-3, and controller device 112-4, collectively referred to as "controller devices 112"). In some embodiments, the workstations 108 may each include an interaction area through which an operator may interact with the storage containers 106 placed at the interaction area by the mobile drive units 104. The interaction area will be discussed in further detail below in connection with the following figures. The mobile drive units 104 may transport storage containers 106 between points within a workspace 110 (e.g., a warehouse, a storage facility, or the like) in response to commands communicated by management module 102. While the management module 102 is depicted in FIG. 1 as being separate from the mobile drive units 104, it should be appreciated that the management module 102, or at least some aspects of the management module 102, may be additionally or alternatively be performed by a processor of the mobile drive units 104. Within the inventory system 100, each of the storage containers 106 may store one or more types of inventory items. As a result, inventory system 100 may be capable of moving inventory items between locations within the workspace 110 to facilitate the entry, processing, and/or removal of inventory items from inventory system 100 and the completion of other tasks involving inventory items.

In accordance with some embodiments, the management module 102 may assign tasks to appropriate components of inventory system 100 and may coordinate operations of the various components in completing the tasks. The management module 102 may select components of inventory system 100 (e.g., workstations 108, mobile drive units 104, and/or workstation operators (not depicted), etc.) to perform these tasks and communicate appropriate commands and/or data to the selected components to facilitate completion of these operations. In some embodiments, workstation operators may utilize a computing devices such as a station computing device (discussed further with respect to FIG. 2), a scanner, a smart device, or the like to receive such commands or exchange any suitable information with the management module 102. Although shown in FIG. 1 as a single, discrete component, the management module 102 may represent multiple components and may represent or include portions of the mobile drive units 104 or other elements of the inventory system 100. The components and operation of an example embodiment of management module 102 are discussed further below with respect to FIG. 6.

The mobile drive units 104 may move storage containers 106 between locations within the workspace 110. The mobile drive units 104 may represent any devices or components appropriate to move (e.g., propel, pull, etc.) a storage container based on the characteristics and configuration of the storage containers 106 and/or other elements of inventory system 100. In a particular embodiment of inventory system 100, the mobile drive units 104 represent independent, self-powered devices configured to freely move about the workspace 110. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 104 represent elements of a tracked inventory system configured to move the storage containers 106 along tracks, rails, cables, crane system, or other guidance or support elements traversing the workspace 110. In such an embodiment, the mobile drive units 104 may receive power and/or support through a connection to the guidance elements, such as a powered rail. Additionally, in particular embodiments of the inventory system 100 the mobile drive units 104 may be configured to utilize alternative conveyance equipment to move within the workspace 110 and/or between separate portions of the workspace 110.

Additionally, the mobile drive units 104 may be capable of communicating with the management module 102 to receive information identifying selection of the storage containers 106, transmit the locations of the mobile drive units 104, or exchange any other suitable information to be used by the management module 102 or the mobile drive units 104 during operation. The mobile drive units 104 may communicate with the management module 102 wirelessly, using wired connections between the mobile drive units 104 and the management module 102, and/or in any other appropriate manner. As one example, particular embodiments of the mobile drive unit 20 may communicate with the management module 102 and/or with one another using 802.11, Bluetooth®, or Infrared Data Association (IrDA) standards, or any other appropriate wireless communication protocol. As another example, in a tracked inventory system 100, tracks or other guidance elements upon which the mobile drive units 104 move may be wired to facilitate communication between the mobile drive units 104 and other components of the inventory system 100. In general, the mobile drive units 104 may be powered, propelled, and controlled in any manner appropriate based on the configuration and characteristics of the inventory system 100.

In at least one embodiment, the storage containers 106 store inventory items. The storage containers 106 are capable of being carried, rolled, and/or otherwise moved by the mobile drive units 104. In some embodiments, the storage containers 106 may include a plurality of faces, and each storage component (e.g., a bin, a tray, a shelf, an alcove, etc.) may be accessible through one or more faces of the storage container 106. The mobile drive units 104 may be configured to rotate the storage containers 106 at appropriate times to present a particular face to an operator (e.g., human personnel) or other components of the inventory system 100.

In at least one embodiment, inventory items represent any objects suitable for storage, retrieval, and/or processing in an automated inventory system 100. For the purposes of this description, "inventory items" (also referred to as "items" or "an item") may represent any one or more objects of a particular type that are stored in the inventory system 100. In at least one example, the inventory system 100 may represent a mail order warehouse facility (e.g., operated by an electronic marketplace provider), and the items within the warehouse facility may represent merchandise stored in the warehouse facility. As a non-limiting example, the mobile drive units 104 may retrieve the storage containers 106 containing one or more inventory items requested in an order to be packed for delivery to a customer. Moreover, in some embodiments of the inventory system 100, boxes containing completed orders may themselves represent inventory items.

In particular embodiments, the inventory system 100 may also include one or more workstations 108. The workstations 108 represent locations designated for the completion of particular tasks involving inventory items. Such tasks may include the removal of inventory items from the storage containers 106, the introduction of inventory items into the storage containers 106, the counting of inventory items in the storage containers 106, the decomposition of inventory items (e.g. from pallet- or case-sized groups to individual inventory items), the consolidation of inventory items between the storage containers 106, and/or the processing or handling of inventory items in any other suitable manner. In particular embodiments, the workstations 108 may represent the physical locations where a particular task involving inventory items can be completed within the workspace 110. In alternative embodiments, the workstations 108 may represent both the physical location and also any appropriate equipment for processing or handling inventory items, such as robotic devices (e.g., robotic arms), scanners for monitoring the flow of inventory items in and out of the inventory system 100, communication interfaces for communicating with the management module 102, and/or any other suitable components. The workstations 108 may be controlled, entirely or in part, by human operators or may be fully automated. Moreover, the human personnel and/or robotic devices of the workstations 108 may be capable of performing certain tasks involving inventory items, such as packing, counting, or transferring inventory items, as part of the operation of the inventory system 100.

Figure 2A:
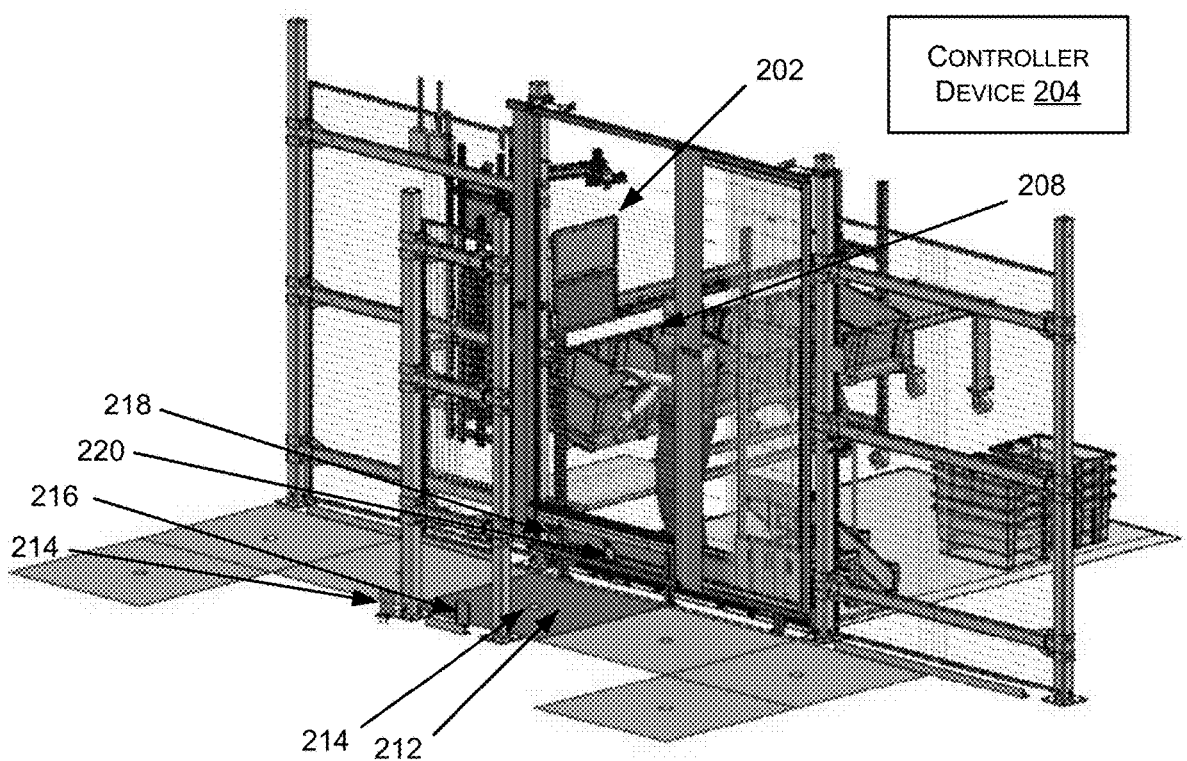
FIGS. 2A and 2B illustrate multiple views of an exemplary workstation having a number of computing components, in accordance with at least one embodiment.
Figure 2B:
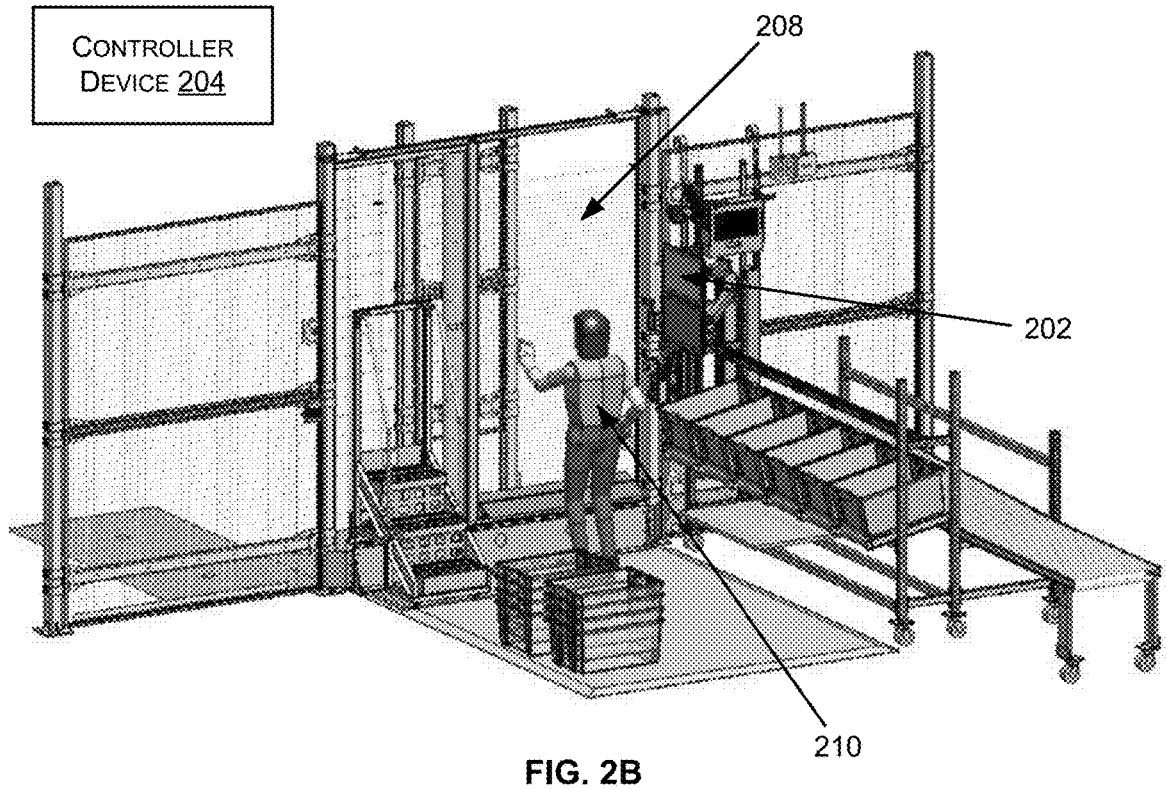

A workstation may include an interaction area through which a storage container placed at the workstation may be accessed. In some embodiments, a light curtain may be generated to span at least some portion of the interaction area utilizing any suitable number of light emitters and corresponding receivers. A workstation may include any suitable number of motion sensors (e.g., time of flight sensors as depicted in FIGS. 2A and 2B) configured to detect motion near the interaction area (e.g., motion of a mobile drive unit and/or storage container, existence of an object within a threshold distance of the interaction area, etc.). In some embodiments, a workstation may further include an indicator device (as depicted in FIGS. 2A and 2B) configured to provide (e.g., audibly and/or visually) an indication of an operating state of the interaction area. A workstation may further include a station computing device (as depicted in FIGS. 2A and 2B) configured to communicate with the management module 102 to receive task assignments and to provide data indicating task performance and/or completion.

A workstation may further include a controller device (e.g., an example of the controller device(s) 112). The controller device may be configured to communicate with the management module 102, the station computing device, the one or more motion sensors, the one or more light emitters/receivers, or any suitable combination of the above. The controller device may be configured to monitor the light curtain for breaches (e.g., objects such as an operator's arm, a robotic arm, and the like, which interrupt the transmission of light between one or more emitters and receivers of the light curtain). In some embodiments, the controller device may be configured to transmit short range wireless signals (e.g., radio signals) receivable by the mobile drive units 104 within a threshold distance of the controller device. Further examples of the workstations and its corresponding components are discussed in further detail with respect to FIGS. 2-5.

In at least one embodiment, the workspace 110 represents an area associated with the inventory system 100 in which the mobile drive units 104 can move and/or the storage containers 106 can be stored. For example, the workspace 110 may represent all or part of the floor of a mail-order warehouse in which the inventory system 100 operates. Although FIG. 1 shows, for the purposes of illustration, an embodiment of the inventory system 100 in which the workspace 110 includes a fixed, predetermined, and finite physical space, particular embodiments of the inventory system 100 may include the mobile drive units 104 and the storage containers 106 that are configured to operate within the workspace 110 that is of variable dimensions and/or an arbitrary geometry. While FIG. 1 illustrates a particular embodiment of the inventory system 100 in which the workspace 110 is entirely enclosed in a building, alternative embodiments may utilize the workspace 110 in which some or all of the workspace 110 is located outdoors, within a vehicle (such as a cargo ship), or otherwise unconstrained by any fixed structure.

In operation, the management module 102 may select appropriate components to complete particular tasks and may transmit task assignments 116 to the selected components to trigger completion of the relevant tasks. Each of the task assignments 116 defines one or more tasks to be completed by a particular component. These tasks may relate to the retrieval, storage, replenishment, and counting of inventory items and/or the management of the mobile drive units 104, the storage containers 106, the workstations 108, workstation operators, and/or other components of the inventory system 100. Depending on the component and the task to be completed, a task assignment may identify locations, components, and/or actions/commands associated with the corresponding task and/or any other appropriate information to be used by the relevant component in completing the assigned task.

In particular embodiments, the management module 102 may generate task assignments 116 based, in part, on inventory requests that the management module 102 receives from other components of the inventory system 100 and/or from external components in communication with the management module 102. These inventory requests identify particular operations to be completed involving inventory items stored or to be stored within the inventory system 100 and may represent communication of any suitable form. For example, in particular embodiments, an inventory request may represent a shipping order specifying particular inventory items that have been purchased by a customer and that are to be retrieved from the inventory system 100 for shipment to the customer. After generating one or more of the task assignments 116, the management module 102 may transmit the generated task assignments 116 to appropriate components (e.g., mobile drive units 104, the workstations 108, corresponding operators, etc.) for completion of the corresponding task. The relevant components may then execute their assigned tasks.

With respect to the mobile drive units 104 specifically, the management module 102 may, in particular embodiments, communicate task assignments 116 to selected mobile drive units 104 that identify one or more destinations for the selected mobile drive units 104. The management module 102 may select a mobile drive unit (e.g., mobile drive unit 104-1) to assign the relevant task based on the location or state of the selected mobile drive unit, an indication that the selected mobile drive unit has completed a previously-assigned task, a predetermined schedule, and/or any other suitable consideration. These destinations may be associated with an inventory request the management module 102 is executing or a management objective the management module 102 is attempting to fulfill. For example, the task assignment may define the location of a storage container 106 to be retrieved, a workstation to be visited (e.g., workstation 108-1), or a location associated with any other task appropriate based on the configuration, characteristics, and/or state of inventory system 100, as a whole, or individual components of the inventory system 100.

As part of completing these tasks the mobile drive units 104 may dock with and transport the storage containers 106 within the workspace 110. The mobile drive units 104 may dock with the storage containers 106 by connecting to, lifting, and/or otherwise interacting with the storage containers 106 in any other suitable manner so that, when docked, the mobile drive units 104 are coupled to and/or support the storage containers 106 and can move the storage containers 106 within the workspace 110. The mobile drive units 104 and storage containers 106 may be configured to dock in any manner suitable to allow a mobile drive unit to move a storage container within workspace 110. In some embodiments, the mobile drive units 104 represent all or portions of the storage containers 106. In such embodiments, the mobile drive units 104 may not dock with the storage containers 106 before transporting the storage containers 106 and/or the mobile drive units 104 may each remain continually docked with a storage container.

In some embodiments, the management module 102 may be configured to communicate the task assignments 116 to the workstations 108 to instruct those components (and/or robotic devices and/or operators of the workstations 108) to perform one or more tasks. The mobile drive units 104 and/or station computing devices of the workstations 108 may individually be configured to provide task performance information to the management module 102. Task performance information may include any suitable data related to the performance of an assigned task. By way of example, a mobile drive unit may send task performance information to the management module 102 indicating that the task of moving a particular storage container to a particular workstation has been completed. A station computing device may transmit task performance information to the management module 102 indicating that an item has been placed in or removed from the selected storage container. Generally, any suitable information associated with task performance (e.g., a task identifier, a time of completion, an error code or other indication that the task was unsuccessful, a reason code or other indication as to why task performance was unsuccessful, etc.) may be provided as part of the task performance information.

While the appropriate components of inventory system 100 complete assigned tasks, the management module 102 may interact with the relevant components to ensure the efficient use of space, equipment, manpower, and other resources available to inventory system 100. As one specific example of such interaction, management module 102 is responsible, in particular embodiments, for planning the paths the mobile drive units 104 take when moving within the workspace 110 and for allocating use of a particular portion of the workspace 110 to a particular mobile drive units 104 for purposes of completing an assigned task. In such embodiments, the mobile drive units 104 may, in response to being assigned a task, request a path to a particular destination associated with the task.

Components of the inventory system 100 (e.g., the mobile drive units 104, and/or the station computing devices of the workstations 108, and/or controller device(s) 112) may provide information to the management module 102 regarding their current state, other components of the inventory system 100 with which they are interacting, and/or other conditions relevant to the operation of the inventory system 100. This may allow the management module 102 to utilize feedback from the relevant components to update algorithm parameters, adjust policies, or otherwise modify its decision-making to respond to changes in operating conditions or the occurrence of particular events.

In addition, while the management module 102 may be configured to manage various aspects of the operation of the components of the inventory system 100, in particular embodiments, the components themselves may also be responsible for decision-making relating to certain aspects of their operation, thereby reducing the processing load on the management module 102.

Thus, based on its knowledge of the location, current state, and/or other characteristics of the various components of the inventory system 100 and an awareness of all the tasks currently being completed, the management module 102 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making (such as the techniques provided by the controller device(s) 112 as discussed herein), particular embodiments of the inventory system 100 may be able to support a number of techniques for efficiently executing various aspects of the operation of the inventory system 100. As a result, particular embodiments of the management module 102 may, by implementing one or more management techniques described below, enhance the efficiency of the inventory system 100 and/or provide other operational benefits.

FIGS. 2A and 2B illustrate multiple views of an exemplary workstation 200 having a number of computing components, in accordance with at least one embodiment. As depicted, FIG. 2A shows a view from a floor of a workspace toward the workstation 200 while FIG. 2B shows a view from just behind the workstation 200 toward the floor of the workspace.

The workstation 200 may be configured in any suitable matter and may span any suitable area of any suitable dimensions. In at least one embodiment, the workstation 200 may include any suitable number of components such as station computing device 202. Station computing device 202 (an example of computing device(s) 608 described below in connection with FIG. 6) may be configured to manage task assignment and/or completion of tasks within workstation 200. In some embodiments, the station computing device 202 may include any suitable user interfaces and/or input/output devices to enable an operator to sign in to the station computing device 202. In some embodiments, the station computing device 202 may be configured to communicate with the management module 102 of FIG. 1 to receive task assignments and/or transmit requests to release a mobile drive unit from the interaction area. The station computing device 202 may be configured to transmit any suitable data indicating an operating state of the workstation 200 as provided by the controller device 204 (e.g., an example of the controller device(s) 112 of FIG. 1). Controller device 204 may be situated in any suitable location of the workstation 200. In some embodiments, the controller device 204 may be configured to communicate with any suitable component of the workstation 200.

The workstation 200 may include one or more sensors (e.g., any suitable combination of sensors 214-220) for detecting motion at/near an interaction area 208. The sensors 214-220 may include, for example, time of flight sensors configured to detect motion and/or an object at the location 212 (e.g., in front of the interaction area 208 on the workspace floor). The interaction area 208 may be a fully or partially enclosed area through which an operator 210 may reach through to access a storage container place at location 212. Location 212 may include a physical marker 214 (e.g., a fiducial marker that indicates a location within the workspace) that is placed at a particular distance from the interaction area 208. The mobile drive unit (the mobile drive units 104 of FIG. 1) may be configured to traverse the workspace floor utilizing fiducial markers for navigation. It may be the case that the mobile drive units are configured to utilize onboard sensors to align themselves with the fiducial markers as they traverse the floor. Accordingly, a mobile drive unit of the mobile drive units 104 of FIG. 1 may be configured to traverse the floor (e.g., across location 212) utilizing physical marker 214 to align itself to provide a particular distance between a storage container being conveyed by the mobile drive unit and the interaction area 208 (or the light curtain of the interaction area 208).

Figure 3:
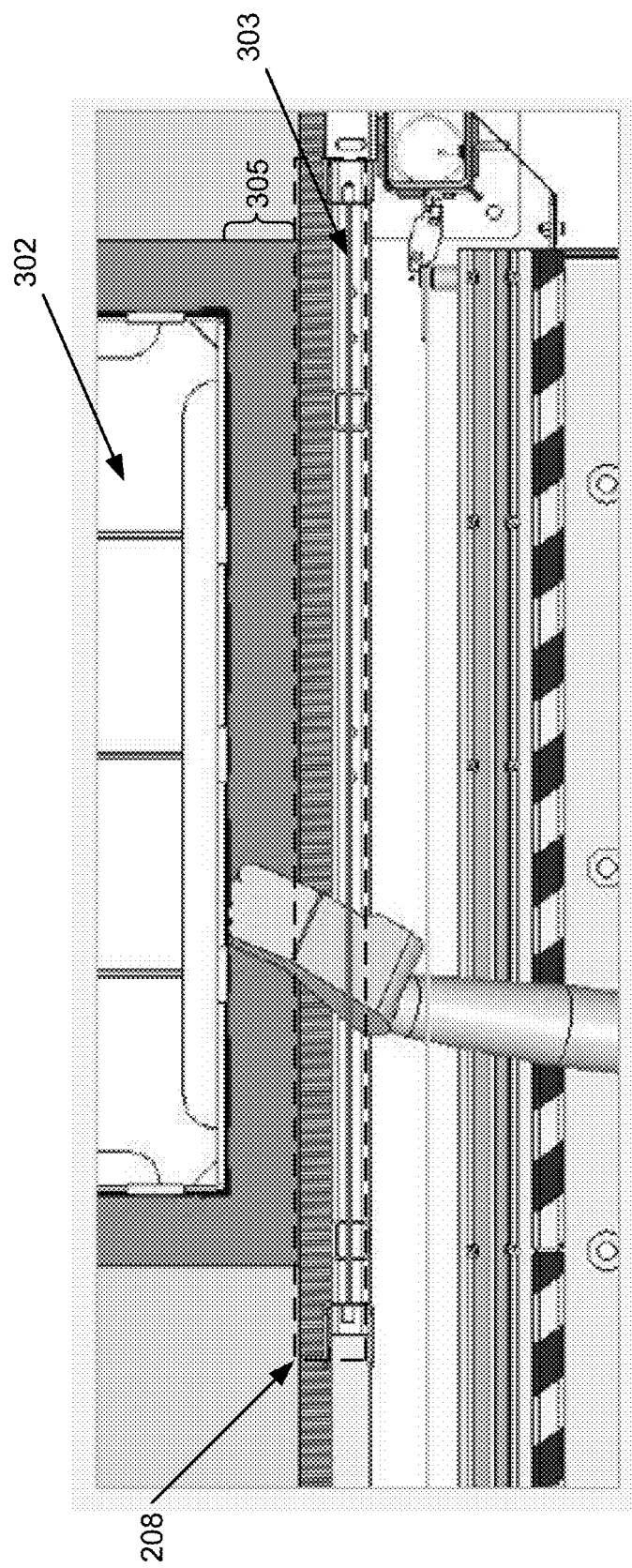
FIG. 3 is a schematic diagram illustrating an example spacing between a storage container and an interaction area, in accordance with at least on embodiment.

By way of example, FIG. 3 is a schematic diagram illustrating an example spacing between a storage container 302 and an interaction area (e.g., the interaction area 208 of FIG. 2), in accordance with at least on embodiment. FIG. 3 depicts a top down view of the interaction area 208 with a storage container 302 placed just outside the interaction area 208 (at location 212 of FIG. 2A) according to traversing, by a mobile drive unit, the physical marker 214 of FIG. 2.

In at least one embodiment, the physical marker 214 may be placed at that location to ensure that, as its traversed by a mobile drive unit, the storage container 302 conveyed by the mobile drive unit will pass at a distance 305 from the interaction area 208. In some embodiments, the distance 305 may be within a range of 120-150 millimeters. In some embodiments, the range may be predetermined to correspond to a spacing that would make it unlikely for a human being to bypass the storage container 302 to enter the workspace floor (e.g., the floor of the workspace 110 of FIG. 1). The spacing may also ensure that injury to the operator and/or damage to property is avoided as the storage container 302 passes by the interaction area 208. As depicted, the distance 305 may be measured from the edge of the interaction area 208, although in some embodiments, the distance 305 may be measure from the light curtain 303.

Returning to FIG. 2, once a user has signed in and/or signed out of the station computing device 202, an indication of that condition may be sent to the controller device 204.

The controller device 204 may be configured to transition to an "armed" state. While operating in the "armed" state, the controller device 204 may be configured to react to breaches of the interaction area 208.

In some embodiments, the interaction area 208 may include a light curtain generated from any suitable number of light emitters and receivers (e.g., infra-red light emitters/receivers). In some embodiments, a number of light emitters may be placed on one side of the interaction area 208, and an equal number of light receivers may be placed on an opposite side of the interaction area 208. These emitters/receivers may generate a light curtain spanning at least a portion of the interaction area 208.

For example, FIGS. 4A and 4B are schematic diagrams illustrating multiple views of an exemplary interaction area 208 including a light curtain 402 and an indicator device 404, in accordance with at least one embodiment. FIG. 4A depicts a view of the interaction area 208 as viewed from inside the workstation 200 of FIG. 2 toward the workspace 110 of FIG. 1, while FIG. 4B depicts a view of the interaction area 208 from the workspace 110 toward the workstation 200. It should be appreciated that the configuration of the workstation 200 and/or the interaction area 208 are intended to be illustrative in nature and other configurations are contemplated.

The interaction area 208 may be any suitable dimensions. In some embodiments, as depicted in FIGS. 4A and 4B, the interaction area 208 may span an area that begins some distance from the floor of the workstation 200. As depicted in FIGS. 4A and 4B, the interaction area 208 may include a window (or 3 sided structure) through which an operator may reach through to access a storage container.

The interaction area 208 may include a light curtain 402. The light curtain 402 may span any suitable portion of the interaction area 208. In some embodiments, such as the one depicted in FIG. 4A, the light curtain 402 may span the entire area of the interaction area 208, while in FIG. 4B, the light curtain 402 is depicted as spanning a portion of the interaction area 208. The light curtain 402 may be generated from any suitable number of light emitters and receivers. By way of example, 80-100 light emitters may be placed at one side (e.g., side 406) of the interaction area 208 and a same number of light receivers may be placed at an opposing side (e.g., side 408) of the interaction area 208. In some embodiments, each light emitter may be aligned with a corresponding light receiver that is configured to detect the light emitted by a particular light emitter. In some embodiments, the light emitters/receivers are infra-red sensors. Accordingly to some embodiments, the light emitters may be placed at a distance of 25-35 mm from one another. Similarly, the light receivers may be placed at a distance of 25-35 from one another according to the spacing of the light emitters. Thus, the light curtain 402, through such placement of the emitters and receivers, may be configured to detect a breach in the light curtain for any suitable object (e.g., an item, a robotic arm, an operator's arm, etc.) larger than 25 mm as the object passes through the light curtain.

In some embodiments, the light emitters may be configured to emit a corresponding light emission in a predetermined sequence and/or at a predetermined periodicity. For example, the light emitters may generate the light curtain by sequential emitting a light emission. Each light emission may be generated within a threshold time period of the previous light emission. In some embodiments, the sequential emissions may be generated in rapid succession and the sequence of emissions may be looped such that the sequence is repeated any suitable number of times.

Figure 5A:
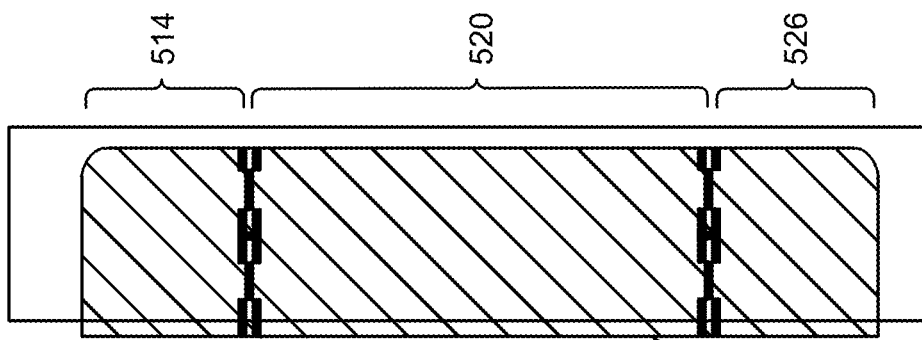
FIGS. 5A-5C are schematic diagrams illustrating multiple views of an exemplary indicator device, in accordance with at least one embodiment.
Figure 5B:
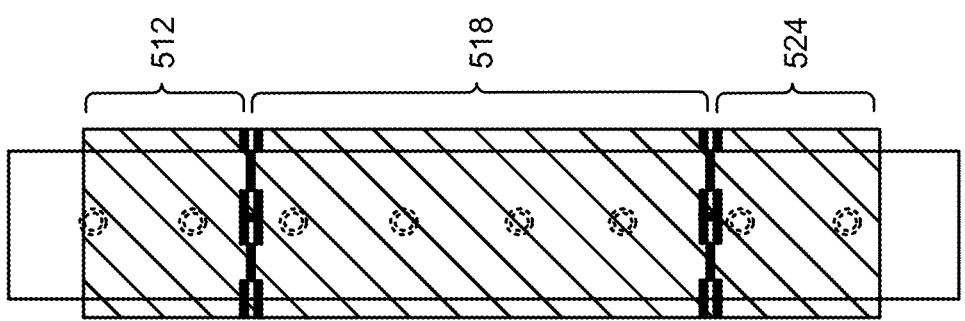
Figure 5C:
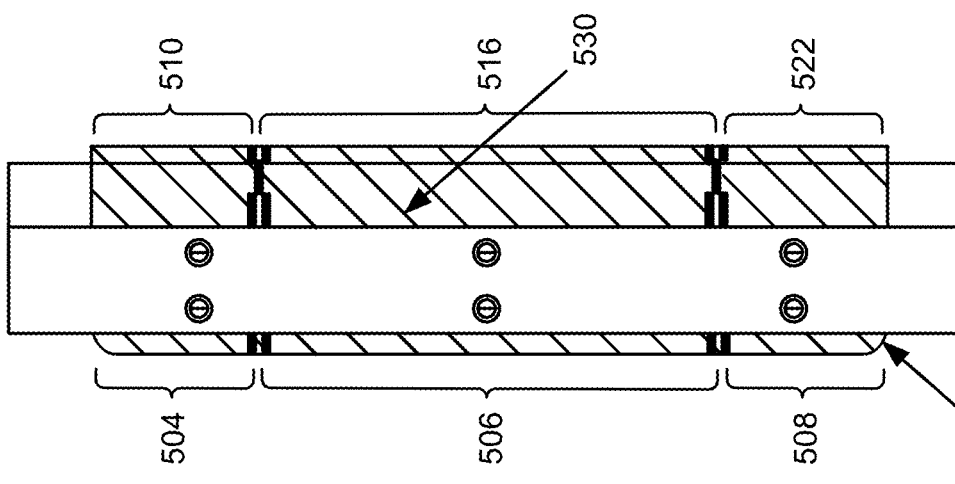

In some embodiments, the interaction area 208 may further include an indicator device 404. FIGS. 5A-5C are schematic diagrams illustrating multiple views of an exemplary indicator device 502 (e.g., the indicator device 404 of FIG. 4), in accordance with at least one embodiment. FIG. 5A is intended to depict a side view of the indicator device 502 as viewed from the workstation 200 of FIG. 2. FIG. 5B is intended to depict a view of the indicator device as viewed from within the interaction area 208 of FIGS. 2A, 2B, 4A, and 4B. FIG. 5C is intended to depict a view of the indicator device 502 from a workspace (e.g., the workspace 110 of FIG. 1) toward the workstation 200.

The indicator device 502 may include one or more areas. As depicted, the indicator device 502 includes three areas (e.g., top area 504, middle area 506, and bottom area 508). The top area 504 may include areas 510, 512, and 514. The middle area 506 may include areas 516, 518, and 520. The bottom area 508 may include the areas 522, 524, and 526.

The indicator device 502 may be constructed from any suitable solid substrate (e.g., plastic, glass, etc.). The indicator device 502, in some embodiments, may be configured as a light pipe through which light is projected. In some embodiments, the indicator device 502 may include any suitable number of indents/etchings (e.g., etching 530). The indicator device 502 may be configured to pipe light through the substrate such that the light is not visible in smooth areas, but light is emitted at the indents/etchings. The indents/etchings may be configured as depicted in FIGS. 5A-5C or the etchings may be differently configured.

In some embodiments, top area 504, middle area 506 and bottom area 508 are distinct pieces of plastic that are attached to one another in the configuration depicted. The configuration may enable the top area 504, the middle area 506, and the bottom area 508 to be utilized independently from one another as desired.

The indicator device may include one or more processors (not depicted) configured to receive data from the controller device 204 and display state information in response to receiving such data.

Returning to FIG. 2, the operator 210 may sign in to station computing device 202 to indicate he is ready to receive a task. In some embodiments, the operator 210 may select a task/type of task to be assigned. The management module 102 of FIG. 1 may perform any suitable method for assigning a task to the operator 210/workstation 200 according to the current tasks available within the workspace 110.

Upon signing on, authenticating the operator 210, or at any suitable time, the station computing device 202 may communicate information (e.g., usage data such as an operator identifier, an indicator that the workstation 200 is being used, etc.) to the controller device 204 indicating that the station is in use. In some embodiments, the controller device 204 may transition to an "armed" state in response to receiving the usage data. In other embodiments, the usage data will not cause a transition if the controller device 204 is already operating in an "armed" state. In response to transitioning to an "armed" state, or at any suitable time, the controller device 204 may be configured to cause an indicator device (e.g., the indicator device 502 of FIGS. 5A-5C, located within the workstation 200) to indicate that the light curtain is armed (and/or that the controller device 204 is operating in an armed state). By way of example, the controller device 204 may cause the indicator device 502 to display yellow light at least one area of the indicator device 502 (e.g., at top area 504 and bottom area 508) according to a predetermined pattern and/or scheme.

In at least one embodiment, while operating in the "armed" state, the controller device 204 may be configured to react (e.g., perform one or more remedial actions) to breaches detected at the light curtain. By way of example, the controller device 204 may receive sensor data from one or more emitters and/or receivers generating the light curtain (e.g., the light curtain 402 of FIGS. 4A and 4B) within the interaction area 208. The controller device 204 may be configured to receive sensor data indicating that at least one light receiver of the light curtain has failed to detect a light emission from its corresponding light emitter. Upon receiving sensor data indicating a breach of the light curtain 402, the controller device 204 may be configured to transition to a "breach" state. In response to transitioning to a "breach" state, or at any suitable time, the controller device 204 may be configured to cause an indicator device (e.g., the indicator device 502 of FIGS. 5A-5C, located within the workstation 200) to indicate that the light curtain has been breached (and/or that the controller device 204 is operating in a breach state). By way of example, the controller device 204 may cause the indicator device 502 to display red light within at least one area of the indicator device 502 (e.g., the top area 504, the middle area 506, and the bottom area 508, or any suitable combination of the above) according to any suitable predetermined pattern and/or scheme. In some embodiments, the red light may be displayed as a flashing light according to the predetermined pattern and/or scheme.

In some embodiments, the controller device 204 may perform a remedial action that may include transmitting, via a short-range wireless signal (e.g., a radio signal), a command to halt motion of one or more mobile drive units within a threshold distance of the controller device 204. By way of example, the short-range wireless signal may be transmitted at a frequency of 120-130 MHz having a limited range within which the signal may be received. Accordingly, one or more mobile drive units within a threshold distance of the controller device 204 may receive the signal. In some embodiments, reception of the signal alone (without additional transmitted data) may cause the one or more mobile drive units to halt motion and/or task performance. In some embodiments, the controller device 204 may be configured to transmit the signal at any suitable periodicity while it operates in the breach state. The mobile drive units (e.g., the mobile drive units 104 of FIG. 1) may be configured to remain stationary so long as the signal is being received. In some embodiments, once the signal has stopped being transmitted, the mobile drive units may be configured to wait a period of time (e.g., 5 seconds since last reception) before resuming their corresponding tasks.

Subsequent to transitioning to a "breach" state, or at any suitable time, the controller device 204 may receive an indication from a user interface of the controller device 204 (e.g., an input device such as a button, a keyboard, and the like, a mechanical key, etc.) and/or the station computing device 202 indicating a start request and/or reset request. By way of example, the operator 210 (or another authorized user such as a manager) may utilize the station computing device 202 and/or the user interface of the controller device 204 to start the controller device 204 (e.g., arm the controller device and the light curtain) and/or reset the controller device 204 to recover from a breach state. Upon receiving a start and/or reset request, the controller device 204 may transition to an "armed" state. Upon transitioning to the armed state, or at any suitable time, the controller device 204 may cause the indicator device 502 to present an indication of the current operating state (e.g., "armed"). If the controller device 204 was previously operating in a "breach" state, the controller device 204 may be configured to halt transmission of the radio signal upon transitioning to an "armed" state.

While operating in an "armed" state, the controller device 204 may be configured to receive sensor data from any suitable combination of sensor devices 214-220. By way of example, the workstation 200 may include only sensor devices 218 and 220 (although the workstation may include more or fewer sensor devices potentially arranged in a different configuration). In some embodiments, sensor device 218 may be placed just inside an edge of the interaction area 208. As depicted in FIG. 2, the sensor device 220 may be placed in the middle, or substantially near the middle of the interaction area 208. It should be appreciated that other configuration and/or arrangements of the sensor devices 218 and 220 are contemplated and this example is not intended on being limiting in nature. In some embodiments, the controller device 204 may be configured to identify that a mobile drive unit/storage container is approaching the interaction area 208. As a non-limiting example, the controller device 204 may receive sensor data from the sensor device 218, followed by sensor data received from the sensor device 220. In some embodiments, the controller device 204 may be configured to determine that a mobile drive unit/storage container is approaching based at least in part on the order in which the sensor data is generated. For example, the mobile drive units of the workspace 110 may be routed (e.g., by the management module 102) to approach the interaction area 208 from a particular direction. If approaching from that direction, the mobile drive unit and/or the storage container should pass by the sensor device 218 first, followed by the sensor device 220. If the sensor devices generate sensor data in that order, the controller device 204 may be configured to determine that a mobile drive unit and/or storage container is within the interaction area. If the sensor data is generated in a different order, the controller device 204 may be configured to ignore such sensor data.

In some embodiments, subsequent to determining that a mobile drive unit/storage container is near the interaction area 208, the controller device 204 may be configured to transition to a "ready" state. By way of example, the controller device 204 may be configured to transition to a "ready" state on receipt (or at least in response to receipt) of sensor data from the sensor device 220. In some embodiments, this transition may occur before the mobile drive unit and/or storage container come to a complete stop (although the mobile drive unit may be slow moving at the time it passes the sensor device 220). In response to transitioning to a "ready" state, or at any suitable time, the controller device 204 may be configured to cause an indicator device (e.g., the indicator device 502 of FIGS. 5A-5C, located within the workstation 200) to indicate that the operator may interact with the storage container (and/or that the controller device 204 is operating in a "ready state"). By way of example, the controller device 204 may cause the indicator device 502 to display green light within at least one area of the indicator device 502 (e.g., the middle area 506) according to any suitable predetermined pattern and/or scheme.

In at least one embodiment, while the controller device 204 operates in the "ready" state, the operator 210 may breach the light curtain any suitable number of times in accordance with his assigned task. When his task is complete and the operator 210 no longer requires access to the storage container, he may request that the mobile drive unit be released (moved) from the workstation 200. In some embodiments, he may make this request via a physical button of the workstation 200 (not depicted) and/or a user interface of the station computing device 202. A release request may be transmitted from the station computing device 202 to the controller device 204.

Upon receiving the release request, the controller device 204 may analyze current sensor data provided by the emitters/receivers of the light curtain to identify whether or not an object is currently breaching the light curtain. If no object is breaching the light curtain, the controller device 204 may transition to an "armed" state, cause the armed state to be indicated by the indicator device 502, and transmit a message back to the station computing device 202 granting the release request. Upon receiving a grant to its release request, the station computing device 202 may be configured to transmit data to the management module 102 requesting that the mobile drive unit/storage container be moved (and/or reporting completion of a task). Upon receipt, the management module 102 may determine instructions for moving the mobile drive unit and may transmit those instructions to the mobile drive unit where, upon receipt by the mobile drive unit, cause the mobile drive unit to move away from the workstation 200.

If the controller device 204 determines, in response to a release request, that the light curtain is currently being breached, the controller device 204 may wait a predetermined period of time (e.g., 3 seconds, 5 seconds, etc.) to determine if the breach is resolved. If sensor data is received within that time period indicating that there are no object currently breaching the light curtain, the controller device 204 may grant the release request as described above. In some embodiments, the controller device 204 may indicate (e.g., via the indicator device 502, via the station computing device 202) that a release request has been received but an object is currently breaching the light curtain in order to notify the user that the object(s) must be moved. In some embodiments, if the breach is not resolved within the time period, the controller device 204 may deny the release request and transmit an indication of the denial to the station computing device 202. Upon receiving the denial of the release request, the station computing device 202 may cause the mobile drive unit to be restricted from moving away from the workstation 200. For example, the station computing device 202 may be configured to transmit an indication of the denial to the management module 102 to cause the management module 102 to restrict the mobile drive unit from moving. In some embodiments, the station computing device 202 itself may perform the restriction by failing to request that the mobile drive unit be moved until such time as it receives a grant to a release request for the mobile drive unit. Upon receiving a denial, the station computing device 202 may transmit another request in response to additional user input and/or the station computing device 202 may transmit one or more additional release requests at any suitable frequency (e.g., every 10 seconds) any suitable number of times (e.g., 5 times). The station computing device 202 may potentially continue to transmit release request until such time as it receives a grant to its request.

By utilizing the controller device 204 to perform the techniques discussed above, safety measures of the inventory system are improved. For example, utilizing physical marker placement, a threshold distance between a mobile drive unit/storage container and an interaction area may be maintained so as to avoid injury to a storage container, the operator(s), or any suitable component of the system. Additionally, or alternatively, by utilizing the controller device 204, the system may ensure that breaches of the light curtain are detected when there is a danger of injury (e.g., while components are in motion). Should a breach occur, the short range nature of the signal provided by the controller device may ensure efficient use of the workspace and increase throughput during such instances. Instead of, for example, shutting down an entire floor due to a breach being detected, safety measures (e.g., the halting of one or more mobile drive units) may be localized to affect only components located within a threshold distance of the breach. As yet another enhancement, once a storage container is stationed, the controller device may further improve safety at the workstation by ensuring that the storage container may not be moved while it is being accessed by an operator. Any suitable combination of the above improvements can lead to a safer and more efficient use of a workspace, which in turn, may increase throughput of the system as a whole.

Figure 6:
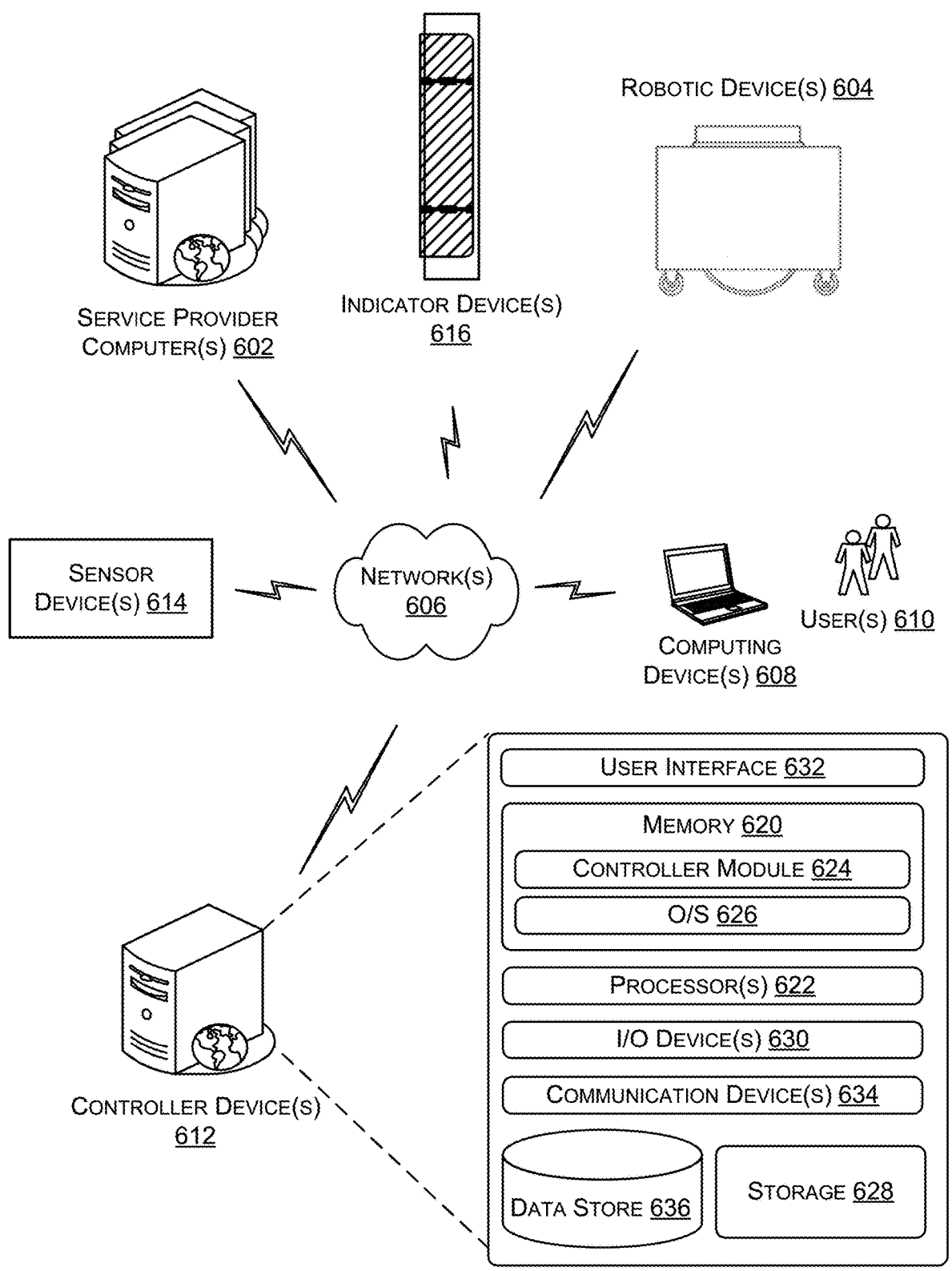
FIG. 6 is an example system architecture for implementing aspects of the inventory system, in accordance with at least one embodiment.

FIG. 6 is an example system architecture for system 600 for implementing aspect of the system 600 of FIG. 1, in accordance with at least one embodiment. The system 600 may include service provider computer(s) 602. The service provider computer(s) 602 may support an electronic marketplace (not shown) and interface with purchase and delivery services of the electronic marketplace. The management module 102 of FIG. 1, operating as part of the service provider computer(s) 602, may coordinate receiving, storing, packaging, and shipping of items in a workspace (e.g., the workspace 110 of FIG. 1) operated by, or on behalf of, the electronic marketplace provider. In some examples, the service provider computer(s) 602 may be a stand-alone service operated on its own or in connection with an electronic marketplace. In either example, the service provider computer(s) 602 may be in communication with the robotic device(s) 604 (e.g., the mobile drive units 104 of FIG. 1), and/or the computing device(s) 608, and/or the controller device(s) 612 via one or more network(s) 606 (hereinafter, "the network 606"). The network 606 may include any one or a combination of many different types of networks, such as cable networks, the Internet, wireless networks, cellular networks, radio networks, and other private and/or public networks. The functionality provided by the management module 102 discussed above with respect to FIG. 1 may be, at least in part, provided by a management module operating on the service provider computer(s) 602.

Computing device(s) 608 (e.g., station computing devices associated with a workstations 108 of FIG. 1, the station computing device 202 of FIG. 2, etc.) may also be in communication with the service provider computer(s) 602 via the network 606. The computing device(s) 608 may be operable by one or more users 610 (hereinafter, "the users 610," an example of the operator 210 of FIG. 2) to access the service provider computer(s) 602 via the network 606. The computing device(s) 608 may be any suitable device (e.g., portable or non-portable) capable of communicating with the network 606. For example, the computing device(s) 608 may be any suitable computing device such as, but not limited to, a mobile phone, a smart phone, a personal digital assistant (PDA), a laptop computer, a thin-client device, a tablet PC, a desktop computer, a scanner, or other computing device. The computing device(s) 608 may include one or more processors, memory, I/O devices, one or more data stores, additional storage, and an operating system. The functionality provided by the management module 102 discussed above with respect to FIG. 1 may be, at least in part, provided by a management module operating on computing device(s) 608.

Turning now to the details of the robotic device(s) 604. The robotic device(s) 604 may be examples of the mobile drive units 104 of FIG. 1. In some embodiments, the robotic device(s) 604 may include an onboard computer including at least one memory and one or more processing units. The processor(s) may be implemented as appropriate in hardware, computer-executable instructions, software, firmware, or combinations thereof. Computer-executable instruction, software or firmware implementations of the processor(s) may include computer-executable or machine-executable instructions written in any suitable programming language to perform the various functions described. The memory may include more than one memory and may be distributed throughout the onboard computer. The memory may store program instructions that are loadable and executable on the processor(s), as well as data generated during the execution of these programs. The functionality provided by the management module 102 discussed above with respect to FIG. 1 may be, at least in part, provided by a management module operating on the robotic device(s) 604.

Depending on the configuration and type of memory of the robotic device(s) 604 the memory may be volatile (such as random access memory (RAM)) and/or non-volatile (such as read-only memory (ROM), flash memory, or other memory). The memory may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM. Turning to the contents of the memory in more detail, the memory may include an operating system and one or more application programs, modules or services for implementing the features disclosed herein.

In some examples, the onboard computer of the robotic device(s) 604 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices.

The memory and the additional storage, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer. The modules of the onboard computer of the robotic device(s) 604 may include one or more components. The onboard computer of the robotic device(s) 604 may also include input/output (I/O) device(s) and/or ports, such as for enabling connection with a keyboard, a mouse, a pen, a voice input device, a touch input device, a display, speakers, a printer, or other I/O device. The robotic device(s) 604 may include any suitable communication devices (e.g., a radio signal receiver for receiving short range transmission from the controller device(s) 612).

The onboard computer of the robotic device(s) 604 may also include one or more data stores. The data stores may include one or more databases, data structures, or the like for storing and/or retaining information associated with the robotic device(s) 604 such as any suitable data related to task assignments, instructions, and/or task performance information.

The service provider computer(s) 602, perhaps arranged in a cluster of servers or as a server farm, may host web service applications. These servers may be configured to host a website (or combination of websites). In at least one example, the service provider computer(s) 602 may be configured to manage the robotic devices 604 as part of an inventory system (e.g., the inventory system 100). The service provider computer(s) 602 may include at least one memory and one or more processing units. The processor(s) may be implemented as appropriate in hardware, computer-executable instructions, software, firmware, or combinations thereof. Computer-executable instruction, software or firmware implementations of the processor(s) may include computer-executable or machine-executable instructions written in any suitable programming language to perform the various functions described.

The memory may include more than one memory and may be distributed throughout the service provider computer(s) 602. The memory may store program instructions (e.g., management module 102) that are loadable and executable on the processor(s), as well as data generated during the execution of these programs. Depending on the configuration and type of memory including the management module 102 of FIG. 1, the memory may be volatile (such as random access memory (RAM)) and/or non-volatile (such as read-only memory (ROM), flash memory, or other memory). The service provider computer(s) 602 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

The memory of the service provider computer(s) may include an operating system and one or more application programs, modules or services for implementing the features disclosed herein including at least the management module 102. The management module 102, in some examples, may function at least in part at the robotic device(s) 604. For example, when the robotic device(s) 604 are in network communication with the service provider computer(s) 602, the robotic device(s) 604 may receive at least some instructions from the service provider computer(s) 602. In some examples, the robotic device(s) 604 may individually execute the management module 102 (e.g., that implement the features described with respect to task assignment, task performance, and/or peer-to-peer communication features) to operate independent of the service provider computer(s) 602.

In some examples, the service provider computer(s) 602 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices.

The memory and the additional storage, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer(s) 602. The modules of the service provider computer(s) 602 may include one or more components. The service provider computer(s) 602 may also include input/output (I/O) device(s) and/or ports, such as for enabling connection with a keyboard, a mouse, a pen, a voice input device, a touch input device, a display, speakers, a printer, or other I/O device.

In some examples, the service provider computer(s) 602 may include a user interface. The user interface may be utilized by an operator, or other authorized user to access portions of the service provider computer(s) 602. In some examples, the user interface may include a graphical user interface, web-based applications, programmatic interfaces such as application programming interfaces (APIs), or other user interface configurations. The service provider computer(s) 602 may also include a data store. The data store may include one or more databases, data structures, or the like for storing and/or retaining information associated with the service provider computer(s) 602.

The sensor device(s) 614 (including the sensor device(s) 214-220) may include any suitable number of motion sensors (e.g., time of flight sensors) and/or light emitters/receivers (e.g., infra-red emitters/receivers). In some embodiments, the sensor device(s) 614 may be situated at a workstation associated with the controller device(s) 612. For example, a number of motion sensors may be positioned near an interaction area of the workspace associated with the controller device(s) 612. The sensor device(s) 614 may include any suitable number of light emitters and corresponding receivers configured to produce a light curtain (e.g., light curtain 402 of FIGS. 4A and 4B) that spans some portion of the interaction area of the workspace. In some embodiments, the sensor device(s) 614 may communicate with the controller device(s) 612 via any suitable wired and/or wireless communications protocol (e.g., via the network(s) 606).

The controller device(s) 612 may be an example of the controller device(s) 112 of FIG. 1 and controller device 204 of FIG. 2. In some embodiments, the controller device(s) 612 may include at least one memory 620 and one or more processing units (or processor(s)) 622. The processor(s) 622 may be implemented as appropriate in hardware, computer-executable instructions, software, firmware, or combinations thereof. Computer-executable instruction, software or firmware implementations of the processor(s) 622 may include computer-executable or machine-executable instructions written in any suitable programming language to perform the various functions described. The memory 620 may include more than one memory and may be distributed throughout the onboard computer. The memory 620 may store program instructions (e.g. the controller module 624) that are loadable and executable on the processor(s) 622, as well as data generated during the execution of these programs. The controller module 624 may store instructions that, when executed by the processor(s) 622, provide the functionality discussed herein of the controller device(s) 612.

Depending on the configuration and type of memory, the memory 620 may be volatile (such as random access memory (RAM)) and/or non-volatile (such as read-only memory (ROM), flash memory, or other memory). The memory 620 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 620 may include multiple different types of memory, such as static random access memory (SRAM), dynamic random access memory (DRAM), or ROM. Turning to the contents of the memory 620 in more detail, the memory 620 may include an operating system 626 and one or more application programs, modules or services for implementing the features disclosed herein including at least the controller module 624.

In some examples, the controller device(s) 612 may also include additional storage 628, which may include removable storage and/or non-removable storage. The additional storage 628 may include, but is not limited to, magnetic storage, optical disks, and/or tape storage. The disk drives and their associated computer-readable media may provide non-volatile storage of computer-readable instructions, data structures, program modules, and other data for the computing devices.

The memory 620 and the additional storage 628, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the controller device(s) 612. The modules of the controller device(s) 612 may include one or more components. The controller device(s) 612 may also include input/output (I/O) device(s) 630 and/or ports, such as for enabling connection with a keyboard, a mouse, a pen, a voice input device, a touch input device, a display, speakers, a printer, or other I/O device. The I/O device(s) 630 may enable communication with the other systems of the robotic devices 509.

In some examples, the controller device(s) 612 may include a user interface 632. The user interface 632 may be utilized by an operator, or other authorized user to access portions of the controller device(s) 612. In some examples, the user interface 632 may include a graphical user interface, web-based applications, programmatic interfaces such as application programming interfaces (APIs), or other user interface configurations. The controller device(s) 612 may also include data store 636. The data store may include one or more databases, data structures, or the like for storing and/or retaining information associated with the controller device(s) 612.

In some examples, the controller device(s) 612 may include communication device(s) 634. The communication device(s) 634 may include any suitable transmitter and/or receiver device configured to transmit and receive data wirelessly via network(s) 606 to service provider computer(s) 602, sensor device(s) 614, robotic device(s) 604, and/or computing device(s) 608. The communication device(s) 634 may include any suitable short-range wireless communications transmitter. In some embodiments, the robotic device(s) 604 may be configured with a receiver configured to receive data via a corresponding wireless communications receiver.

Figure 7:
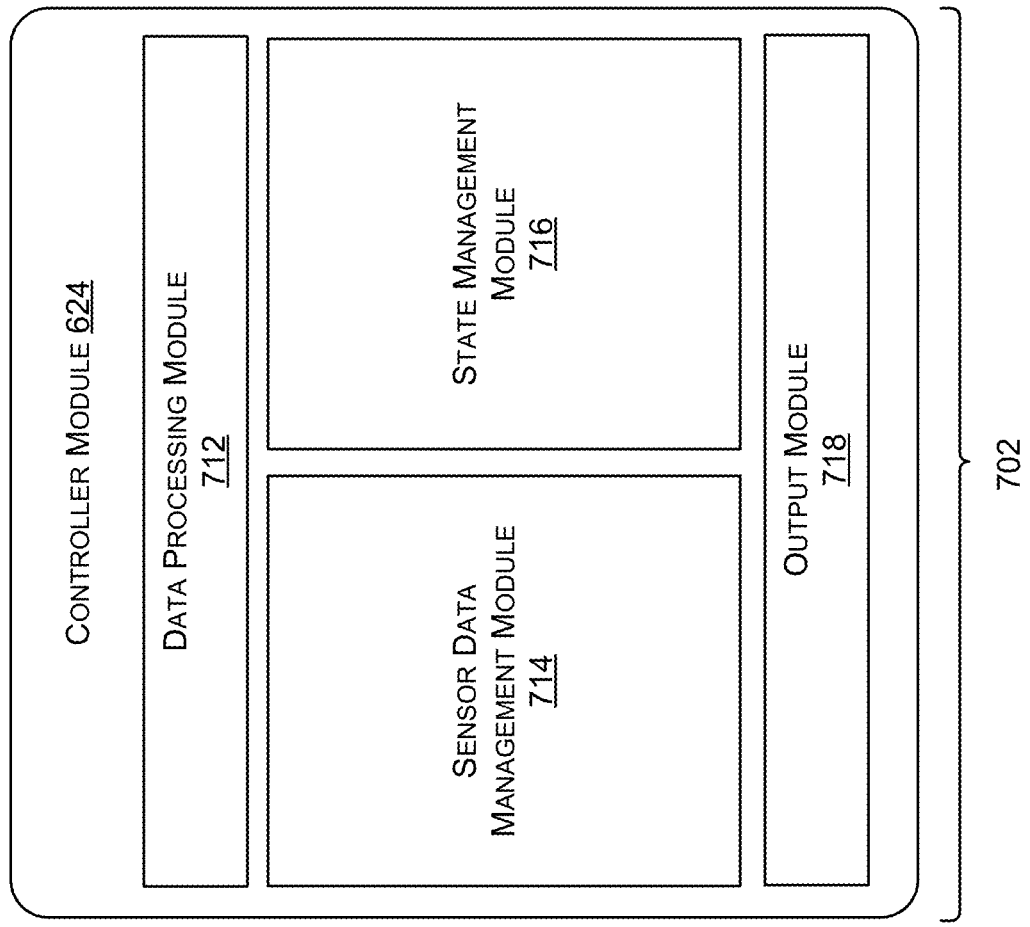
FIG. 7 illustrates in greater detail the components of an example guard controller engine that may be utilized in particular embodiments of the inventory system shown in FIG. 1.

FIG. 7 illustrates in greater detail the components of a particular embodiment of a controller module 624 of FIG. 6, according to at least one embodiments. As shown, the example embodiment includes a data processing module 712, a sensor data management module 714, a state management module 716, and an output module 718. In general, the controller module 624 may include any appropriate combination of hardware and/or software suitable to provide the described functionality.

In at least one embodiment, the data processing module 712 may be configured to receive any suitable data from any suitable source. By way of example, the data processing module 712 may be configured to receive any suitable data from a station computing device (e.g., an example of the computing device(s) 608 of FIG. 6), the service provider computer(s) 602, the robotic device(s) 604, the sensor device(s) 614, and the like. In some embodiments, the data processing module 712 may receive an indication that a workstation associated with the controller module 624 (e.g., a workstation at which the controller device(s) 612 is located) is in use. The controller module 624 may receive requests (e.g., from the computing device(s) 608) for state information. In some embodiments, the data processing module 712 may receive sensor data from one or more sensors of a workstation (e.g., the sensor device(s) 614 of FIG. 6). In some embodiments, this sensor data may include an indication that motion is detect at one or more sensors and/or that one or more light receivers of a light curtain did not receive a light transmitted by a corresponding light emitter. At any suitable time, the data processing module 712 may receive a start request and/or a reset request and/or a release request associated with enabling a mobile drive unit to leave the interaction area. A start and/or reset request may, in some embodiments, be initiated manually (e.g., by depressing a physical button and/or turning a mechanical key) or electronically (e.g., via a user interface of the computing device(s) 608). The release request may be received from the computing device(s) 608 or any suitable component of the system 600 of FIG. 6 (an example of the inventory system 100 of FIG. 1). The data processing module 712 may be configured to communicate any suitable received data to any suitable combination of the remaining modules 702. By way of example, the data processing module 712 may forward the received data and/or otherwise stimulate the functionality of the sensor data management module 714 upon receipt of sensor data. In response to a request for state information and/or the receipt of a start and/or reset request (e.g., an override indication/request), the data processing module 712 may forward the received data and/or otherwise stimulate the functionality of the state management module 716.

In at least one embodiments, the sensor data management module 714 may be configured to receive data from the data processing module 712. By way of example, sensor data received by the data processing module 712 may be forwarded to the sensor data management module 714 for processing. In some embodiments, the sensor data from one or more sensors located near an interaction area of a workspace may indicate motion at the interaction area. For example, motion sensors may be arranged as depicted in FIG. 2A. In some embodiments, the sensor data may additionally or alternatively include data indicating that one or more light receivers failed to receive a light (e.g., an infra-red light) from a corresponding light emitter. The light receivers and emitters may generate a light curtain (e.g., the light curtains depicted in FIGS. 2A, 2B, 5A, and 5B) at an interaction area monitored by the controller module 624. In at least some embodiments, the sensor data management module 714 may receive an indication (e.g., from the data processing module 712) that a release request has been received corresponding to a request for a mobile drive unit to leave the interaction area. In some embodiments, the sensor data management module 714 may analyze sensor data over a time period (e.g., a 3 second time period, a 5 second time period, etc.) to identify whether an object has breached the light curtain, or if a previously breaching object has been moved. In some embodiments, the sensor data management module 714 may be configured to stimulate the functionality of the output module 718 and/or the state management module 716.

The sensor data management module 714 may analyze motion data of the sensor data to identify that a mobile drive unit and/or a storage container are approaching the interaction area. In some embodiments, the sensor data management module 714 may be configured to identify an approaching mobile drive unit by identifying that a number of sensors configured to monitor the interaction area have sensed motion in a particular, predetermined sequence. By way of example, the sensor data management module 714 may be configured to identify that a mobile drive unit/storage container is approaching only when the two (or more) sensors read motion in a particular sequence. That is, by physical constraint of the system, the mobile drive units may be configured to approach an interaction area from a particular direction. Accordingly, the sensor data management module 714 may be configured to ignore motion that occurs in any order other than the predetermined sequence (e.g., indicating an approach from a different direction). If the sensor data indicates motion in the predetermined sequence, the sensor data management module 714 may be configured to stimulate the functionality of the state management module 716 to transition the controller device(s) 612 to a particular state (e.g., a "ready" state, discussed further below).

In some embodiments, the sensor data management module 714 may be configured to analyze the sensor data of a light curtain (e.g., a light curtain generated by one or more light emitters/receivers) to determine whether or not one or more light receivers failed to receive a corresponding light emission (e.g., infra-red light emission) from a corresponding light emitter. If the sensor data management module 714 determines that the sensor data indicates that one or more light receivers failed to receive its corresponding light emission emitted by its corresponding light emitter, the sensor data management module 714 may be configured to stimulate the functionality of the state management module 716 to transition the controller device(s) 612 to a particular state (e.g., a "breached" stated, discussed further below). The sensor data management module 714 may be configured to utilize current sensor data and/or historical sensor data (e.g., stored by the sensor data management module 714) to identify whether or not an object is currently located at the interaction area and/or whether or not a breach is currently occurring and/or when a breach last occurred. In some embodiments, the sensor data management module 714 may be configured to notify the state management module 716 to transition to "ready" state when a last sensor in the predetermined sequence measures motion. This may cause the controller module 624 to transition to a "ready" state just before the mobile drive unit comes to a complete halt at the interaction area.

In at least one embodiments, the state management module 716 may be configured to manage an operational state of the controller device(s) 612. In some embodiments, the controller device(s) 612 may operate in three states (although more or fewer states are possible): "armed," "ready," and "breach."

While operating in a first state (e.g., an "armed" state), the state management module 716 may be configured to react to a breach detected in a light curtain. By way of example, the state management module 716 may be configured to transition to and/or operate in an armed state when an indication is received (e.g., via the data processing module 712) that the workstation is in use (or that the workstation is no longer in use). While operating in an armed state, the state management module 716 may receive an indication (e.g., from the sensor data management module 714) that an object (e.g., a mobile drive unit/storage container) has entered the interaction area and/or the state management module 716 may receive a request that it transition to "ready" state.

According to receipt of this indication and/or request, the state management module 716 may transition to a "ready" state. Upon transitioning to any suitable state, the state management module 716 may update any suitable number of global variable and/or store any suitable data for maintaining a record of a current and/or historical operating state. It should be appreciated that, in some embodiments, the state management module 716 may only enable the controller module 624 to operate in a "ready" state when the sensor data (e.g., motion data) indicates that the interaction area is substantially blocked by an object (e.g., a storage container). This may help ensure that no one passes through the interaction area into the workspace floor during robotic operations. While operating in the "ready" state, breaches in the light curtain may be ignored. Although the light curtain may still be monitored, any data indicating a breach of the light curtain may be ignored while operating in "ready" state.

The state management module 716 may further operate in a "breach" state. By way of example, while the state management module 716 is operating in an "armed" state, it may receive (e.g., from the sensor data management module 714 and/or the data processing module 712) indication that the light curtain has been breached and/or a request to transition to a "breach" state. In response, the state management module 716 may transition to a "breach" state. In some embodiments, while operating in the "breach" state, the state management module 716 may be configured to cause the output module 718 to transmit a short-range wireless signal (e.g., a radio signal). This signal may be a broadcasted signal operating at a predetermined frequency (e.g., 120-130 MHz). In some embodiments, the state management module 716 may be configured to maintain transmission of the broadcasted signal so long as the state management module 716 operates in the "breach" state.

It should be appreciated that the state management module 716 may be configured to transmit data to the output module 718 during, or subsequent to transitioning to a state, to cause an indicator device (e.g., the indicator device of FIGS. 5A-5C) to present an indication of the current operating state. By way of example, upon transitioning to an "armed" state, the state management module 716 may cause the output module 718 to transmit data to the indicator device to cause the indicator device to present (e.g., visually or audibly) a pattern and/or sound indicative of operation in the "armed" state. For example, the indicator device could emit yellow light from a top area and a bottom area of the indicator device. In some embodiments, upon transitioning to an "ready" state, the state management module 716 may cause the output module 718 to transmit data to the indicator device to cause the indicator device to present (e.g., visually or audibly) a pattern and/or sound indicative of operation in the "ready" state. For example, the indicator device could emit green light from a middle area of the indicator device. In some embodiments, upon transitioning to a "breach" state, the state management module 716 may cause the output module 718 to transmit data to the indicator device to cause the indicator device to present (e.g., visually or audibly) a pattern and/or sound indicative of operation in the "breach" state. For example, the indicator device could emit red light one or more areas (e.g., 3) of the indicator device. In some embodiments, the indicator device may be configured to emit a solid and/or blinking light corresponding to receiving an indication of a particular operation state.

In some embodiments, the state management module 716 may be configured to receive an indication that a start and/or reset request has been received (e.g., by the data processing module 712). Upon receiving this indication, or at any suitable time, the state management module 716 may be configured to transition to an "armed" state.

In some embodiments, the state management module 716 may be configured to receive a request for state and/or a request to release a mobile drive unit from the interaction area. In response for state information, the state management module 716 may be configured to provide an indication of the current operating state to the output module 718 that in turn may provide the indication of the current state to the requesting device. In some embodiments (e.g., while operating in a "ready" state), the state management module 716 may receive a request to release a mobile drive unit from the interaction area. In these scenarios, the state management module 716 may determine a current operating state and/or may request data (e.g., sensor data, and indication of whether the light curtain is currently being breached) from the sensor data management module 714. Utilizing the sensor data and/or breach indication, the state management module 716 may determine whether to grant or decline the release request. In some embodiments, if the state management module 716 determines a breach is not currently occurring, it may transition to an "armed" state and transmit a message to the requesting device granting the release request. If a breach is currently occurring, the state management module 716 may be configured to monitor the breach for a period of time (e.g., 3 seconds, 5 seconds, etc.) to determine whether the object breaching the light curtain moves out of the light curtain. If the state management module 716 is able to determine, within the predetermined time period, that the breaching object has moved and the light curtain is no longer being breached, the release request may be granted. Otherwise, the release request may be declined.

It should be appreciated that although the modules 702 are discussed as having distinct functionality, it is contemplated that any suitable number of modules 702 may be combined in any suitable manner to provide the functionality described in connection with the controller device(s) 612 of FIG. 6.

Figure 8:
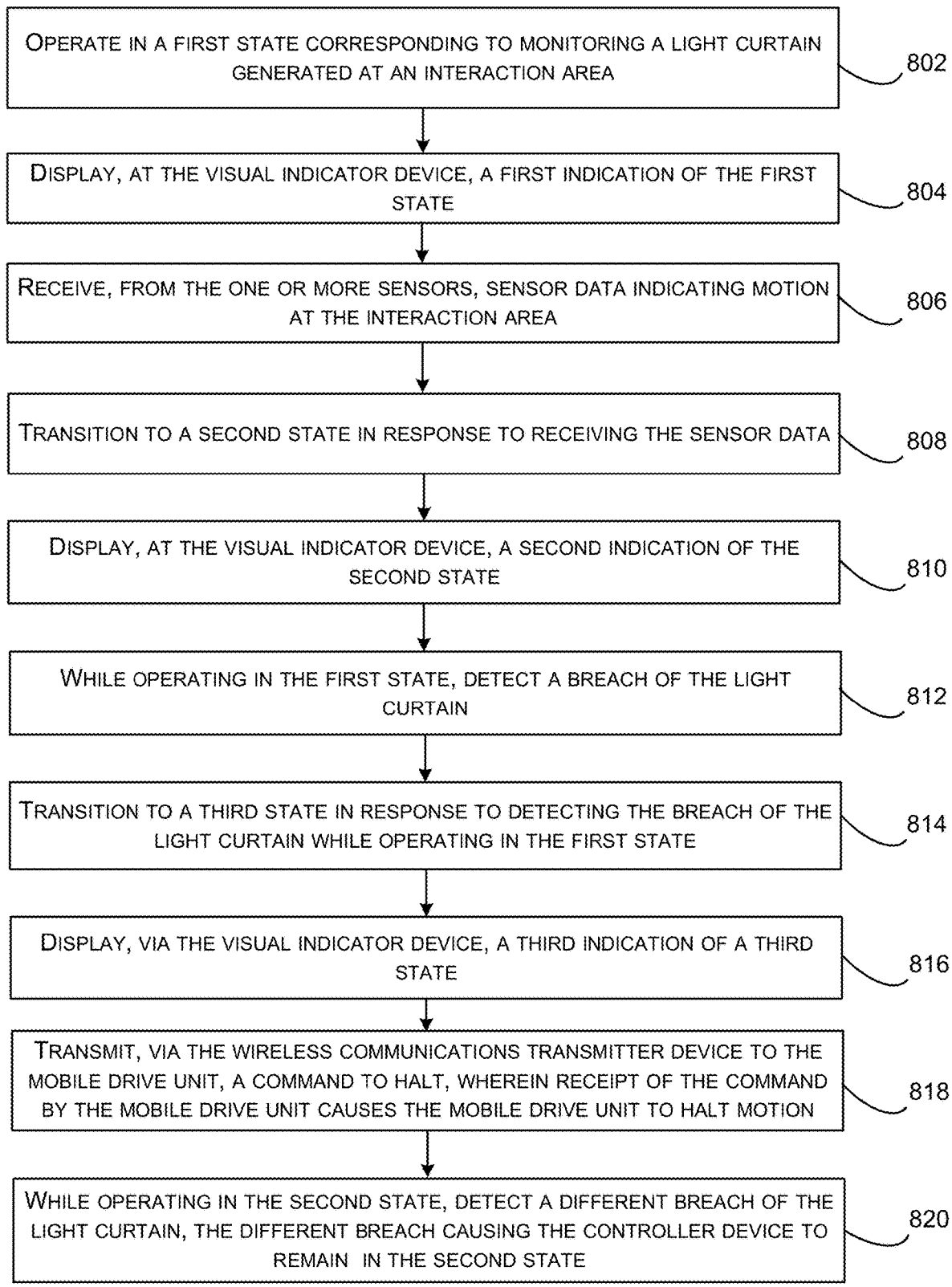
FIG. 8 is a flowchart illustrating an example method for utilizing a controller device to halt motion of one or more mobile drive units, in accordance with at least one embodiment.

FIG. 8 is a flowchart illustrating an example method 800 for utilizing a controller device to halt motion of one or more mobile drive units, in accordance with at least one embodiment. The method 8 may be performed by a system (e.g., the inventory system 100 of FIG. 1, the system 600 of FIG. 6, etc.). The system may comprise any suitable combination of: a mobile drive unit configured to convey a storage container within a workspace, a plurality of light emitters and light receivers generating a light curtain at an interaction area of the workspace, one or more sensors configured to detect motion at the interaction area, a visual indicator device, a computing device associated with the interaction area, and/or a controller device. In some embodiments, the controller device may comprise a wireless communications transmitter device and one or more processors that are configured to perform the method 800. It should be appreciated that the steps of method 800 may be performed in any suitable order. In some embodiments, the method 800 may include more or fewer steps then those depicted in FIG. 8.

At 802, the controller device may operate in a first state corresponding to monitoring a light curtain generated at an interaction area. In some embodiments, the first state may correspond to a particular state (e.g., an "armed" state) of any suitable number of states (e.g., 3) in which the controller device is configured to operate.

At 804, the controller device may display (e.g., at the visual indicator device) a first indication of the first state. By way of example, the controller device may transmit any suitable data via a wired and/or wireless connection/protocol to the visual indicator device to cause the visual indicator device to display a predetermined light and/or pattern and/or color associated with the first state (e.g., two yellow lighted areas spanning a top area and a bottom area of the visual indicator device).

At 806, the controller device may receive, from the one or more sensors (e.g., the sensor device(s) 214-220 of FIG. 2A (or any combination therein), the sensor device(s) 614 of FIG. 6, etc.), sensor data indicating motion at the interaction area. In some embodiments, the controller device may be configured to ensure that only motion that is detected by the one or more sensors in a particular sequence is processed further, while motion occurring in other sequences is ignored.

At 808, the controller device may transition to a second state (e.g., a "ready" state) in response to receiving the sensor data.

At 810, the controller device may display (e.g., at the visual indicator device) a second indication of the second state. By way of example, the controller device may transmit any suitable data via a wired and/or wireless connection/protocol to the visual indicator device to cause the visual indicator device to display a predetermined light and/or pattern and/or color associated with the second state (e.g., a green lighted area spanning a middle area of the visual indicator device).

At 812, while operating in the first state, the controller device may detect a breach of the light curtain. In some embodiments, the breach may be detected utilizing sensor data received from the one or more light emitters and/or light receivers that generate the light curtain. In some embodiments, the sensor data may indicate that at least one light receiver did not receive a light emitted by a corresponding light emitter.

Based at least in part on detecting the breach of the light curtain while operating in a first state, the controller device may be configured to perform the operations at 814-818.

By way of example, at 814, the controller device may transition to a third state (e.g., a "breach" state) in response to detecting the breach of the light curtain while operating in the first state or the second state. At 816 the controller device may display (e.g., at the visual indicator device) a third indication of the third state. For example, the controller device may transmit any suitable data via a wired and/or wireless connection/protocol to the visual indicator device to cause the visual indicator device to display a predetermined light and/or pattern and/or color associated with the third state (e.g., a red lighted area spanning 3 areas of the visual indicator device). At 818, the controller device may transmit, via the wireless communications transmitter device to the mobile drive unit, a command to halt. In some embodiments, a transmission of a radio signal at a particular frequency range (e.g., 120-130 MHz) may be considered a command to halt. The controller device may continuously/periodically transmit such a signal for the duration it operates in the "breach" state." In some embodiments, receipt of the command by the mobile drive unit may cause the mobile drive unit to halt motion. In some embodiments, the mobile drive unit may not resume motion until they have stopped receiving the halt command/signal. In some embodiments, the mobile drive units may be configured to wait some period of time (e.g., 5 seconds) from last receiving the halt command/signal before resuming operations.

If, however, the breach of the light curtain is detected while operating in a first state, the controller device may be configured to perform the operations at 820 rather than the operations at 814-818. For example, while operating in the second state, a different breach of the light curtain may be detected. Although detected, the different breach may cause the controller device to remain in the second state.

Figure 9:
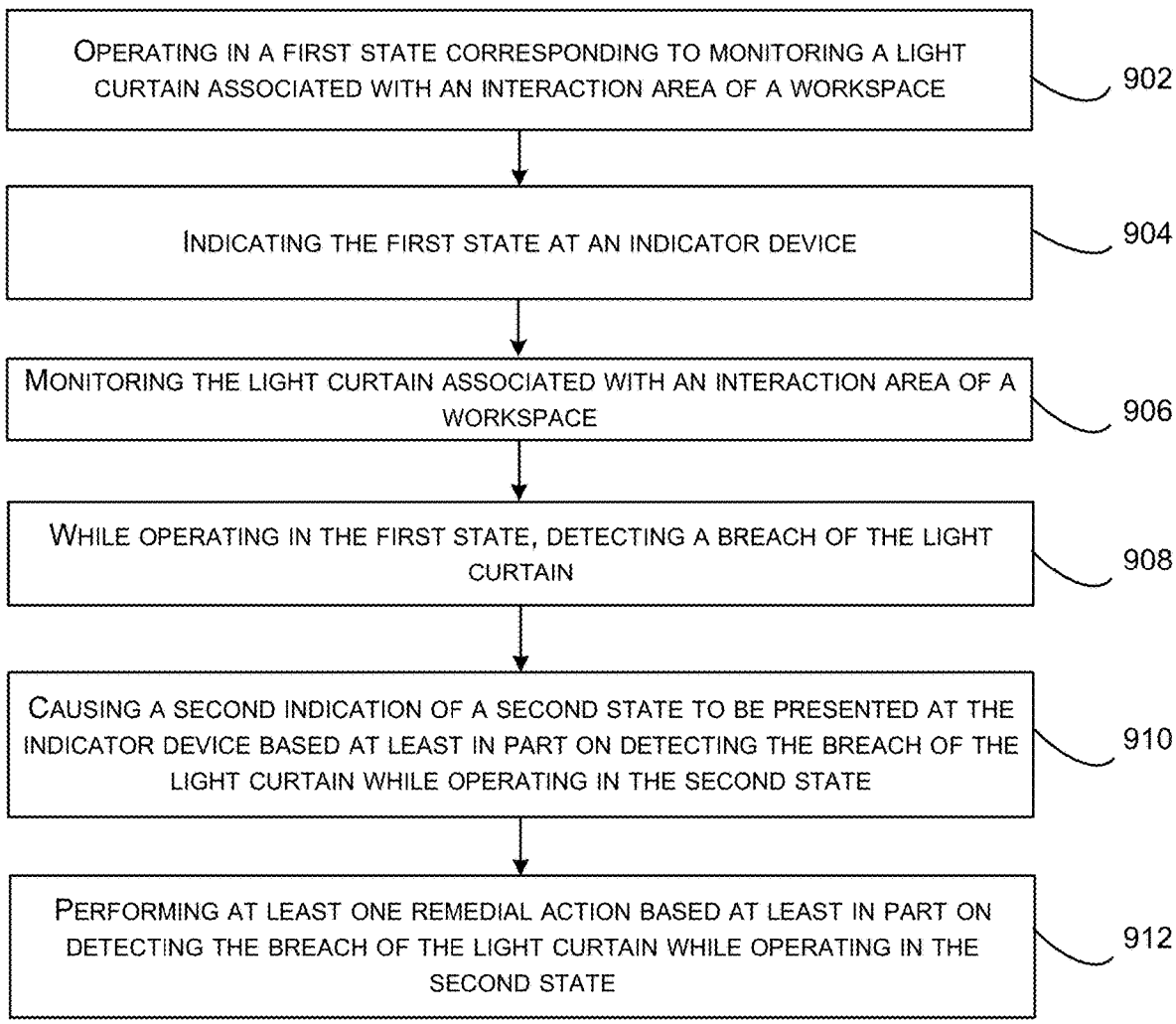
FIG. 9 is a flowchart illustrating an example method for utilizing a controller device to perform at least one remedial action, in accordance with at least one embodiment.

FIG. 9 is a flowchart illustrating an example method 900 for utilizing a controller device to perform at least one remedial action, in accordance with at least one embodiment. The method may be performed by a controller device (e.g., the controller device(s) 112 of FIG. 1, the controller device(s) 612 of FIG. 6). It should be appreciated that more or fewer operations than those depicted in FIG. 9 may be included in the method 900 and that the operations of method 900 may be executed in any suitable order.

The method may begin at 902, where the controller device may operate in a first state corresponding to monitoring a light curtain associated with an interaction area of a workspace. In some embodiments, the light curtain may be generated by one or more sensors (e.g., a plurality of light emitters and a corresponding plurality of light receivers, each light emitter corresponding to a particular light receiver). The light curtain may span a portion of the interaction area of a workspace such as depicted in FIGS. 4A and 4B.

At 904, the controller device may indicate (e.g., visually, audibly, through haptic feedback, etc.) the first state at an indicator device (e.g., such as indicator device of the indicator device of FIGS. 4, 5A, 5B, and 6). By way of example, the controller device may transmit any suitable data via a wired and/or wireless connection/protocol to the indicator device to cause the indicator device to indicate any suitable combination of predetermined sound, and/or vibration, and/or light, and/or pattern, and/or color associated with the first state (e.g., a green lighted area spanning a middle area of the visual indicator device).

At 906, the light curtain may be monitored by the controller device. While monitoring, the controller device may receive sensor data from the sensor(s) 614. In some embodiments, this sensor data may indicate whether or not each of the light receivers in the light curtain received a light emission from its corresponding light emitter.

At 908, while operating in the first state, the controller device may detect a breach of the light curtain. In some embodiments, the breach may be detected utilizing the sensor data received from the one or more light emitters and light receivers that generate the light curtain. In some embodiments, the sensor data may indicate that at least one light receiver did not receive a corresponding light emitted by a corresponding light emitter.

At 910, the controller device may cause an indication (e.g., visually, audibly, through haptic feedback, etc.) of a second state to be presented at the indicator device (e.g., such as indicator device of the indicator device of FIGS. 4, 5A, 5B, and 6). By way of example, the controller device may transmit any suitable data via a wired and/or wireless connection/protocol to the indicator device to cause the indicator device to indicate any suitable combination of predetermined sound, and/or vibration, and/or light, and/or pattern, and/or color associated with the second state (e.g., a red lighted area spanning three areas of the indicator device).

At 912, the controller device may perform at least one remedial action based at least in part on detecting the breach of the light curtain while operating in the second state. By way of example, a remedial action may include transmitting (e.g., broadcasting) a short-range radio signal while operating in the second state. In some embodiments, mobile drive units of the workspace may be configured to halt upon receiving such a signal. The mobile drive units may be configured to remain motionless until such time as they no longer are receiving the signal. In some embodiments, the mobile drive units may be configured to resume activities once the signal has not been received for at least some threshold time period (e.g., 3 seconds, 5 seconds, etc.). In some embodiments, transitioning to the second state and/or indicating the second state at the indicator device may be considered a remedial action performed in response to detecting the breach of the light curtain while operating in the first state. In some embodiments, a remedial action may include notifying one or more users (e.g., via any suitable electronic means such as email, text messaging, push notifications, and/or the like) that the light curtain has been breached and/or that the controller device is operating in the second state.

Figure 10:
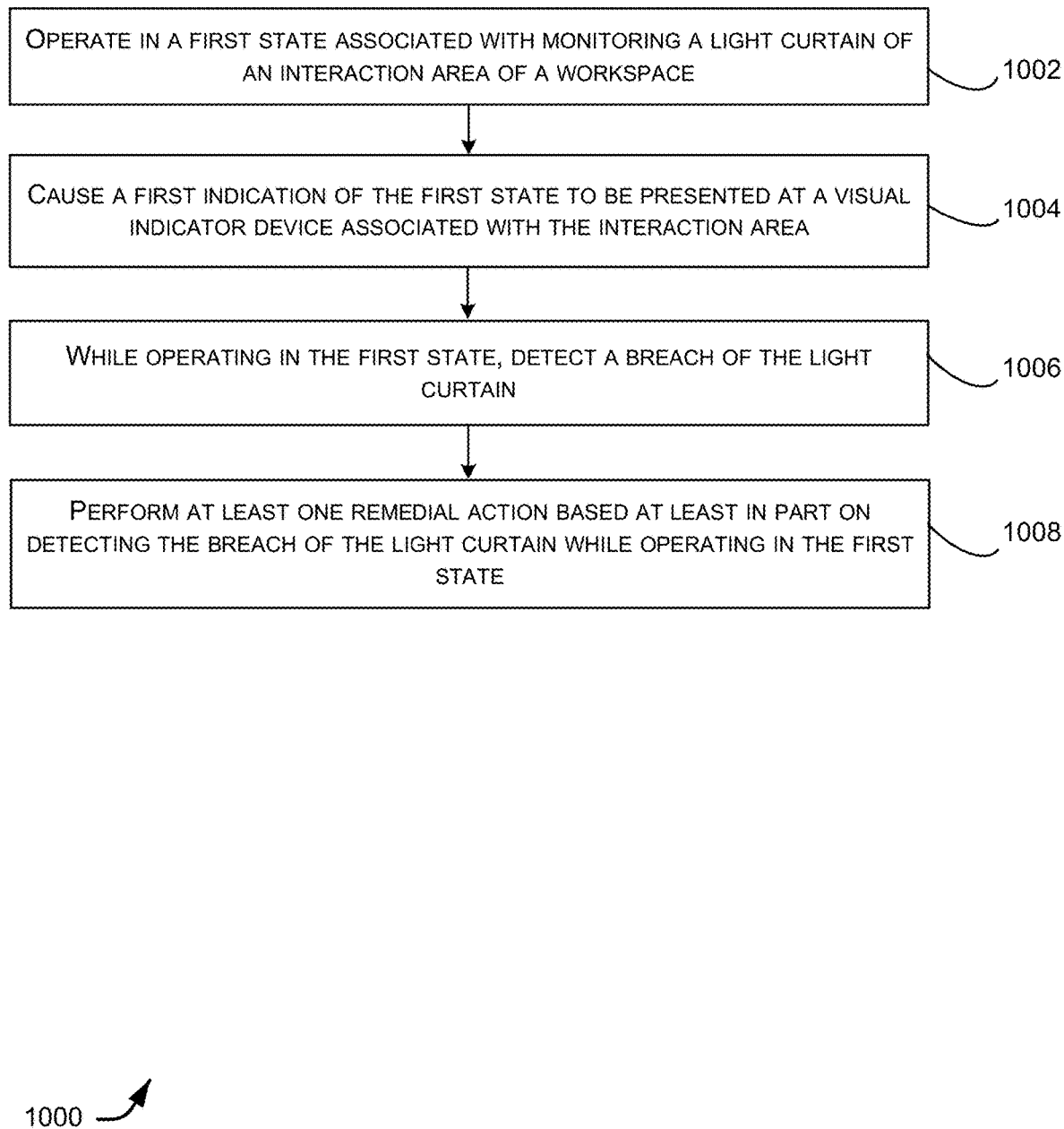
FIG. 10 is a flowchart illustrating another example method for utilizing a controller device to perform at least one remedial action.

FIG. 10 is a flowchart illustrating another example method 1000 for utilizing a controller device to perform at least one remedial action. The method may be performed by one or more processors (e.g., processor(s) 622 of the controller device(s) 612 of FIG. 6). A computer-readable storage medium may comprise computer-readable instructions that, upon execution by one or more processors, cause the one or more processors to perform the method 1000. It should be appreciated that more or fewer operations than those depicted in FIG. 10 may be included in the method 1000 and that the operations of method 1000 may be executed in any suitable order.

The method may begin at 1002, where the one or more processors may cause the controller device to operate in a first state associated with monitoring a light curtain of the interaction area of a workspace. By way of example, the light curtain may be generated by one or more sensors (e.g., a plurality of light emitters and a corresponding plurality of light receivers, each light emitter corresponding to a particular light receiver). The light curtain may span a portion of the interaction area of a workspace such as depicted in FIGS. 4A and 4B. Sensor data provided by the light receivers and/or light emitters of the light curtain may be obtained during the monitoring of the light curtain.

At 1004, the controller device may cause a first indication of the first state to be presented (e.g., visually at a visual indicator device, audibly, through haptic feedback, etc.) at an indicator device associated with the interaction area (e.g., as indicator device of the indicator device of FIGS. 4, 5A, 5B, and 6). By way of example, the controller device may transmit any suitable data via a wired and/or wireless connection/protocol to the indicator device to cause the indicator device to indicate any suitable combination of predetermined sound, and/or vibration, and/or light, and/or pattern, and/or color associated with the first state (e.g., a green lighted area spanning a middle area of the visual indicator device).

At 1006, while operating in the first state, the controller device may detect a breach of the light curtain. In some embodiments, the breach may be detected utilizing sensor data received from the one or more light emitters and light receivers that generate the light curtain. In some embodiments, the sensor data may indicate that at least one light receiver did not receive a corresponding light emitted by a corresponding light emitter.

At 1008, the controller device may perform at least one remedial action based at least in part on detecting the breach of the light curtain while operating in the second state. By way of example, a remedial action may include transmitting (e.g., broadcasting) a short-range radio signal while operating in the second state. In some embodiments, mobile drive units of the workspace may be configured to halt upon receiving such a signal. The mobile drive units may be configured to remain motionless until such time as they no longer are receiving the signal. In some embodiments, the mobile drive units may be configured to resume activities once the signal has not been received for at least some threshold time period (e.g., 3 seconds, 5 seconds, etc.). In some embodiments, transitioning to the second state and/or indicating the second state at the indicator device may be a remedial action performed in response to detecting the breach of the light curtain while operating in the first state. In some embodiments, a remedial action may include notifying one or more users (e.g., via any suitable electronic means such as email, text messaging, push notifications, and/or the like) that the light curtain has been breached and/or that the controller device is operating in the second state.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
    a mobile drive unit configured to convey a storage container within a workspace;
    a plurality of light emitters generating a light curtain at an interaction area of the workspace;
    one or more sensors separate from the mobile drive unit and configured to detect motion at the interaction area;
    a visual indicator device;
    a computing device associated with the interaction area; and
    a controller device, the controller device comprising:
        a wireless communications transmitter device configured to emit a signal of a predefined frequency; and
        one or more processors configured to:
            operate in a first state corresponding to monitoring the light curtain generated at the interaction area;
            display, at the visual indicator device, a first indication of the first state;
            receive, from the one or more sensors, sensor data indicating motion at the interaction area;
            transition to a second state in response to receiving the sensor data;
            display, at the visual indicator device, a second indication of the second state;
            while operating in the first state:
                detect a breach of the light curtain;
                transition to a third state in response to detecting the breach of the light curtain while operating in the first state;
                display, via the visual indicator device, a third indication of the third state; and
                in response to transitioning to the third state, transmit, via the wireless communications transmitter device to the mobile drive unit, the signal of the predefined frequency, wherein receipt of the signal, by one or more mobile drive units within a distance range corresponding to a transmission range of the signal, causes the one or more mobile drive units to halt motion, while any mobile drive unit operating outside the distance range remains mobile; and
            while operating in the second state:
                detect a different breach of the light curtain, the different breach causing the one or more processors to remain operating in the second state.

2. The system of claim 1, wherein the visual indicator device comprises a light pipe having three areas, wherein displaying the first indication, the second indication, and the third indication utilizes a different set of one or more of the three areas.

3. The system of claim 1, wherein the wireless communications transmitter device is configured to transmit short-range messages wirelessly.

4. The system of claim 1, wherein the one or more processors are further configured to:
    detect one or more additional breaches of the light curtain while operating in the third state, wherein detecting the one or more additional breaches fails to cause further processing by the controller device.

5. The system of claim 1, wherein the sensor data corresponds to two motion sensors, wherein the sensor data comprises first sensor data from a first sensor that is received prior to second sensor data from a second sensor, and wherein transitioning to the second state occurs in response to receiving the first sensor data and the second sensor data in an expected order.

6. The system of claim 1, wherein the motion at the interaction area corresponds, at least in part, to conveyance of the storage container, and wherein the storage container is placed within a distance threshold of the interaction area, the interaction area corresponding to a vertical area through which the storage container is accessed.

7. The system of claim 5, wherein the one or more sensors correspond to one or more time of flight sensors associated with the interaction area.

8. A computer-implemented method implemented by a computing system, the method comprising:
    operating in a first state corresponding to monitoring a light curtain associated with an interaction area of a workspace, the light curtain being generated by a plurality of light emitters;
    displaying, at a visual indicator device, a first indication of the first state indicating that the light curtain is being monitored;
    receiving, from one or more sensors at the interaction area, sensor data indicating motion at the interaction area;
    transitioning to a second state in response to receiving the sensor data;
    displaying, at the visual indicator device, a second indication of the second state;

while operating in the first state:
  detecting a breach of the light curtain;
  transitioning to a third state in response to detecting the breach of the light curtain while operating in the first state;
  displaying, at the visual indicator device, a third indication of the third state to be presented at the visual indicator device based at least in part on detecting the breach of the light curtain while operating in the first state;
  in response to transitioning to the third state, transmitting a signal of a predefined frequency via a wireless communications device to a mobile drive unit, wherein receipt of the signal of the predefined frequency by one or more mobile drive units within a distance range corresponding to a transmission range of the signal causes the one or more mobile drive units to halt motion, while any mobile drive unit operating outside the distance range remains mobile; and
while operating in the second state:
  detecting a different breach of the light curtain, the different breach causing the computing system to remain operating in the second state.

9. The computer-implemented method of claim 8, the method further comprising:
transitioning to a fourth state in response to receiving usage data indicating a fourth state of operation associated with the interaction area; and
causing a fourth indication of the fourth state to be displayed at the visual indicator device associated with the interaction area, wherein the first state and the fourth state are a same state.

10. The computer-implemented method of claim 8, the method further comprising:
receiving, from a remote device different from the computing system, an override message corresponding to the third state; and
transitioning to the first state in response to receiving the override message from the remote device.

11. The computer-implemented method of claim 8, wherein the motion at the interaction area corresponds, at least in part, to the mobile drive unit, and wherein the method further comprises:
transitioning to a fourth state in response to detecting that the motion has halted at the interaction area;
while operating in the fourth state, determining that a request to move the mobile drive unit has been submitted; and
causing the request to be rejected while the computing system is operating in the fourth state.

12. The computer-implemented method of claim 11, the method further comprising:
receiving an indication that the interaction area is no longer in use;
transitioning to the first state in response to receiving the indication that the interaction area is no longer in use; and
causing the request to move the mobile drive unit to be granted based at least in part on transitioning to the first state.

13. A computer-readable storage medium comprising computer-executable instructions that, when executed by one or more processors, cause the one or more processors to perform operations comprising:

operating, by a controller device, in a first state associated with monitoring a light curtain of an interaction area of a workspace;
displaying, by the controller device, a first indication of the first state at a visual indicator device associated with the interaction area;
receiving, from one or more sensors at the interaction area, sensor data indicating motion at the interaction area;
transitioning to a second state in response to receiving the sensor data;
displaying, at the visual indicator device, a second indication of the second state;
while operating in the first state:
  detecting, by the controller device, a breach of the light curtain;
  transitioning to a third state in response to detecting the breach of the light curtain;
  displaying, at the visual indicator device, a third indication of a third state;
  and
  transmitting a signal of a predefined frequency via a wireless communications device wherein receipt by the signal by one or more mobile drive units within a distance range corresponding to a transmission range of the signal causes the one or more mobile drive units to halt motion while the signal is being received, while any mobile drive unit operating outside the distance range remains mobile; and
while operating in the second state:
  detect a different breach of the light curtain, the different breach causing the controller device to remain operating in the second state.

14. The computer-readable storage medium of claim 13, wherein the one or more processors are configured to perform further operations comprising:
after detecting the breach, receiving, by the controller device from a remote device, an override indication; and
transitioning, by the controller device, to the first state based at least in part on detecting the override indication.

15. The computer-readable storage medium of claim 13, further comprising:
causing, by the controller device, the second indication of the second state to be presented at the visual indicator device based at least in part on detecting the breach of the light curtain while operating in the second state.

16. The computer-readable storage medium of claim 15, wherein the visual indicator device includes three areas, and wherein causing the second indication to be presented at the visual indication device comprises displaying light at one or more areas of the visual indicator device.

17. The computer-readable storage medium of claim 13, wherein the visual indication device is a light pipe comprising a plurality of indents each configured to present colored light, and wherein the visual indication device is affixed to an edge of the interaction area.

18. The computer-readable storage medium of claim 17, wherein is configured with three sides, each side having three areas, wherein different sets of the three areas are utilized to present a respective indication of the respective state.

* * * * *